(12) United States Patent
Kichkaylo

(10) Patent No.: US 11,709,502 B2
(45) Date of Patent: *Jul. 25, 2023

(54) ROADMAP ANNOTATION FOR DEADLOCK-FREE MULTI-AGENT NAVIGATION

(71) Applicant: Boston Dynamics, Inc., Waltham, MA (US)

(72) Inventor: Tatiana Kichkaylo, Mountain View, CA (US)

(73) Assignee: Boston Dynamics, Inc., Waltham, MA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/838,707

(22) Filed: Apr. 2, 2020

(65) Prior Publication Data

US 2020/0233435 A1   Jul. 23, 2020

Related U.S. Application Data

(63) Continuation of application No. 15/486,219, filed on Apr. 12, 2017, now Pat. No. 10,642,282.

(51) Int. Cl.
*G05D 1/02* (2020.01)
*G05B 19/418* (2006.01)

(52) U.S. Cl.
CPC ......... *G05D 1/0289* (2013.01); *G05B 19/418* (2013.01); *G05B 19/41895* (2013.01);
(Continued)

(58) Field of Classification Search
CPC ......... G05D 1/0289; G05D 2201/0216; G05B 2219/31003; G05B 19/41895
See application file for complete search history.

(56) References Cited

U.S. PATENT DOCUMENTS 5,625,559 A * 4/1997 Egawa ................. G05D 1/0291
                                                    701/117
6,049,295 A     4/2000 Sato
(Continued)

FOREIGN PATENT DOCUMENTS

CN   105652838 A   6/2016
CN   106041931 A   10/2016
(Continued)

OTHER PUBLICATIONS

Hopcroft et al., "On the Complexity of Motion Planning for Multiple Independent Objects: PSpace Hardness of the Warhouseman's Problem," The International Journal of Robotics Research, Dec. 1984, pp. 76-88, vol. 3, No. 4.
(Continued)

*Primary Examiner* — Ryan Rink
(74) *Attorney, Agent, or Firm* — Pierce Atwood LLP

(57) ABSTRACT

Apparatus and methods related to routing robots are provided. A roadmap of an environment that includes first and second robots can be received. The roadmap can be annotated with unidirectional lanes connecting conflict regions, where each lane ends so to avoid blocking a conflict region. First and second routes for the respective uses of the first and second robots can be determined, where both the first and second routes include a first lane connected to a first conflict region. A first, higher priority and a second, lower priority can be assigned to the respective first and second robots. It can be determined that the second robot following the second route will block the first robot on the first lane. Based on the first priority being higher than the second priority, the computing device can alter the second route to prevent the second robot from blocking the first robot.

22 Claims, 21 Drawing Sheets

(52) U.S. Cl.
CPC . *G05D 1/0274* (2013.01); *G05B 2219/31003* (2013.01); *G05B 2219/32328* (2013.01); *G05D 2201/0216* (2013.01); *Y02P 90/02* (2015.11); *Y02P 90/60* (2015.11); *Y02P 90/80* (2015.11)

(56) References Cited

U.S. PATENT DOCUMENTS

| | | | |
|---|---|---|---|
| 8,983,647 B1* | 3/2015 | Dwarakanath | G05D 1/0217 700/216 |
| 9,513,627 B1* | 12/2016 | Elazary | G05D 1/0289 |
| 10,037,029 B1* | 7/2018 | Russell | G01C 21/32 |
| 2006/0095160 A1 | 5/2006 | Orita et al. | |
| 2008/0147306 A1* | 6/2008 | Hayashi | G05D 1/0289 701/117 |
| 2012/0236745 A1 | 9/2012 | Nagai et al. | |
| 2012/0330540 A1 | 12/2012 | Tomonori | |
| 2013/0013178 A1* | 1/2013 | Brant | G08G 1/0133 701/117 |
| 2013/0018572 A1 | 1/2013 | Jang | |
| 2014/0277691 A1* | 9/2014 | Jacobus | G06Q 10/087 700/216 |
| 2015/0019731 A1* | 1/2015 | Abts | G06F 13/1642 709/226 |
| 2015/0285644 A1 | 10/2015 | Pfaff et al. | |
| 2016/0339959 A1* | 11/2016 | Lee | G06K 9/00798 |
| 2017/0017236 A1 | 1/2017 | Song et al. | |
| 2017/0158127 A1 | 6/2017 | Akiyama et al. | |
| 2017/0185085 A1* | 6/2017 | Storfer | G05D 1/0212 |
| 2017/0221364 A1 | 8/2017 | Povey et al. | |
| 2017/0232964 A1 | 8/2017 | Moritani et al. | |
| 2018/0156145 A1* | 6/2018 | Clark | F02D 41/042 |
| 2018/0239343 A1* | 8/2018 | Voorhies | G05D 1/0289 |
| 2018/0321675 A1* | 11/2018 | Russell | G05D 1/0289 |
| 2019/0001987 A1 | 1/2019 | Kim et al. | |
| 2019/0033882 A1 | 1/2019 | Collett et al. | |
| 2020/0334625 A1* | 10/2020 | Li | G07F 9/002 |

FOREIGN PATENT DOCUMENTS

| | | |
|---|---|---|
| CN | 106251016 A | 12/2016 |
| EP | 0618523 | 10/1994 |
| EP | 3203457 A1 | 8/2017 |
| JP | H07219633 | 8/1995 |
| JP | H09-026826 A | 1/1997 |
| JP | H11-143533 A | 5/1999 |
| JP | H11-143534 A | 5/1999 |
| JP | H11-202938 A | 7/1999 |
| JP | 2003-182809 A | 7/2003 |
| JP | 2006-133863 A | 5/2006 |
| JP | 2006293588 A | 10/2006 |
| JP | 2016-071568 A | 5/2016 |
| JP | 2016-170580 A | 9/2016 |
| KR | 10-1286815 B1 | 7/2013 |
| KR | 10-2014-0011247 A | 1/2014 |
| KR | 10-2015-0137166 | 12/2015 |
| WO | 2011070869 | 6/2011 |
| WO | 2013005466 A1 | 10/2013 |

OTHER PUBLICATIONS

Lenstra et al., "Complexity of Machine Scheduling Problems," Annals of Discrete Mathematics, 1977, pp. 343-362, vol. 1.

International Search Report and Written Opinion dated Jun. 19, 2018 in connection with International Application No. PCT/US2018/019780.

International Preliminary Report on Patentability dated Oct. 24, 2019 in connection with International Application No. PCT/US2018/019780.

Yeh et al., Deadlock prediction and avoidance for zone-control AGVS. International Journal of Production Research. Oct. 1, 1998;36(10):2879-89.

* cited by examiner

1510 Receive, at a computing device, a roadmap of an existing environment that includes a first robot and a second robot

1520 Annotate the roadmap with a plurality of lanes connecting a plurality of conflict regions using the computing device, where each lane is unidirectional and ends sufficiently distant from a conflict region to avoid blocking the conflict region

1530 Determine a first route through the environment along the roadmap for use by the first robot and a second route through the environment along the roadmap for use by the second robot, where both the first route and the second route include a first lane, and where the first lane connects to a first conflict region

1540 Assign a first priority to the first robot and a second priority to the second robot, where the first priority is higher than the second priority

1550 Determine that the second robot following the second route will cause the second robot to block the first robot on the first lane before the first robot reaches the first conflict region

1560 Based on the first priority being higher than the second priority, alter the second route to prevent the second robot from blocking the first robot on the first lane

FIG. 15

ROADMAP ANNOTATION FOR DEADLOCK-FREE MULTI-AGENT NAVIGATION

CROSS-REFERENCE TO RELATED APPLICATIONS

The present disclosure is a continuation of U.S. patent application Ser. No. 15/486,219, filed on Apr. 12, 2017, the contents of which are herein incorporated by reference as if fully set forth in this description.

BACKGROUND

One or more robots and/or other actors, such as human actors, can move throughout one or more spaces, such as the interior of one or more buildings and/or one or more outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robots guided by computer control systems.

Mobile robots can be used in a number of different environments to accomplish a variety of tasks. For example, mobile robots can deliver items, such as parts or completed products, within indoor environments, such as warehouses, hospitals and/or data centers. When mobile robots are deployed, they can use one or more possible paths to and from delivery and/or other locations. These paths can be determined using one or more route planning algorithms.

SUMMARY

In one aspect, a method is provided. A computing device receives a roadmap of an existing environment that includes a first robot and a second robot. The computing device annotates the roadmap with a plurality of lanes connecting a plurality of conflict regions, where each lane is unidirectional and ends sufficiently distant from a conflict region to avoid blocking the conflict region. The computing device determines a first route through the environment along the roadmap for use by the first robot and a second route through the environment along the roadmap for use by the second robot, where both the first route and the second route include a first lane, and where the first lane connects to a first conflict region. A first priority is assigned to the first robot and a second priority is assigned to the second robot, where the first priority is higher than the second priority. It is determined that the second robot following the second route will cause the second robot to block the first robot on the first lane before the first robot reaches the first conflict region. Based on the first priority being higher than the second priority, the second route is altered to prevent the second robot from blocking the first robot on the first lane.

In another aspect, a computing device is provided. The computing device includes one or more processors; and data storage including at least computer-executable instructions stored thereon. The computer-executable instructions, when executed by the one or more processors, cause the computing device to: receive a roadmap of an existing environment that includes a first robot and a second robot; annotate the roadmap with a plurality of lanes connecting a plurality of conflict regions, wherein each lane is unidirectional and ends sufficiently distant from a conflict region to avoid blocking the conflict region; determine a first route through the environment along the roadmap for use by the first robot and a second route through the environment along the roadmap for use by the second robot, wherein both the first route and the second route include a first lane, and wherein the first lane connects to a first conflict region; assign a first priority to the first robot and a second priority to the second robot, wherein the first priority is higher than the second priority; determine that the second robot following the second route will cause the second robot to block the first robot on the first lane before the first robot reaches the first conflict region; and based on the first priority being higher than the second priority, alter the second route to prevent the second robot from blocking the first robot on the first lane.

In another aspect, a system is provided. The system includes a computing device and a plurality of robots including a first robot and a second robot. The computing device includes one or more processors; and data storage including at least computer-executable instructions stored thereon. The computer-executable instructions, when executed by the one or more processors, cause the computing device to: receive a roadmap of an existing environment that includes a first robot and a second robot; annotate the roadmap with a plurality of lanes connecting a plurality of conflict regions, where each lane is unidirectional and ends sufficiently distant from a conflict region to avoid blocking the conflict region; determine a first route through the environment along the roadmap for use by the first robot and a second route through the environment along the roadmap for use by the second robot, where both the first route and the second route include a first lane, and where the first lane connects to a first conflict region; assign a first priority to the first robot and a second priority to the second robot, where the first priority is higher than the second priority; determine that the second robot following the second route will cause the second robot to block the first robot on the first lane before the first robot reaches the first conflict region; and based on the first priority being higher than the second priority, alter the second route to prevent the second robot from blocking the first robot on the first lane.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 15 is a flowchart of a method, in accordance with an example embodiment.

DETAILED DESCRIPTION

Overview

Figure 1:
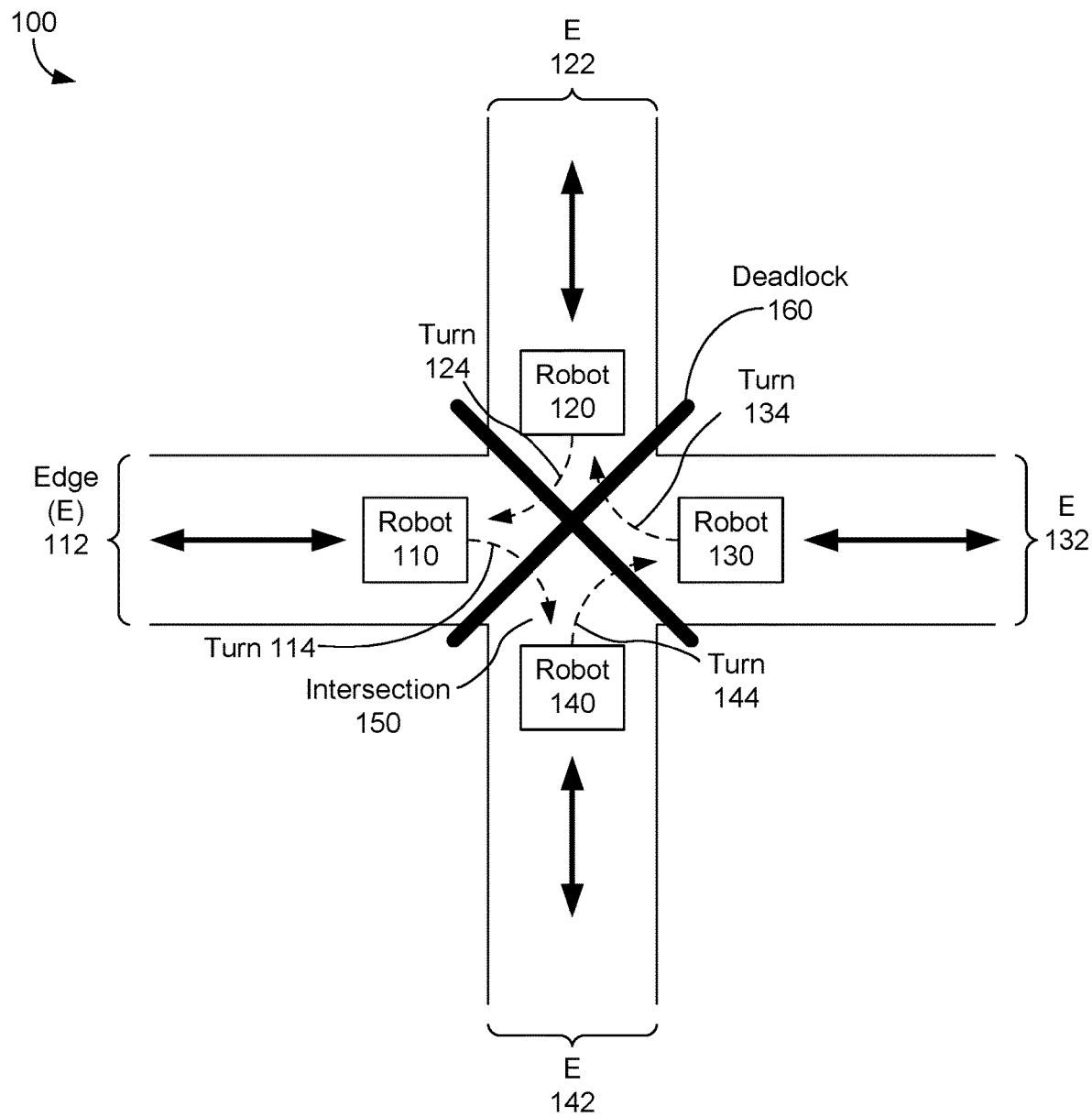
FIG. 1 shows a scenario involving four robots at an intersection of bidirectional edges, in accordance with an example embodiment.

When performing multi-agent planning, such as planning routes of robots in an environment, robots can arrive in positions where they are in a deadlock state, or a state where the robots cannot make progress. FIG. 1 shows scenario 100 involving deadlock of four robots 110, 120, 130, 140 at intersection 150. Edges 112, 122, 132, and 142 come together at intersection 150. In scenario 100, each of edges 112, 122, 132, and 142 are undirected, represent an entire width of a pathway, and allow bidirectional travel along the edge.

In an example, each of robots 110, 120, 130, and 140 is on respective bidirectional edge 112, 122, 132, or 142 near intersection 150 and is instructed to make a respective left turn 114, 124, 134, and 144. For example, robot 110 is on edge 112 and is instructed to make turn 114 onto edge 142. However, edge 142 is occupied by robot 140, which, in turn, is instructed to make left turn 144 onto edge 132. But, edge 132 is occupied by robot 130, which is instructed to make a left turn onto edge 122. Yet, edge 122 is occupied by robot 120, which is instructed to make a left turn onto edge 112. However, edge 112 is occupied by robot 110, which is instructed to make a left turn onto edge 142 (as already mentioned). Thus, robots 110, 120, 130, and 140 cannot make progress and so arrive at deadlock state 160.

In related scenarios, all four of robots 110, 120, 130, 140 can attempt to enter intersection 150 simultaneously. Then, if some or all of robots 110, 120, 130, 140 attempt to turn while in intersection 150 or try to travel straight through intersection 150; two or more of robots 110, 120, 130, 140 may collide.

A multi-agent planner for avoiding deadlocks, such as deadlock state 160, is described herein. The multi-agent planner can first receive a roadmap for an existing environment that includes N agents, N≥1 (note that the case where N=1 may be a trivial example). For non-trivial examples, an environment can have at least two robots R1 and R2. The roadmap can have intersections connected by unidirectional "lanes" L1, L2 . . . Ln, such that a first lane L1 is part of a cycle of lanes; that is, a group of lanes that are connected in a graph-theoretic sense; that is, for every pair of lanes La and Lb, there is a path from La to Lb. Lanes are described in more detail below. The multi-agent planner can assign priority P1 to robot R1 and priority P2 to robot R2, where the priority P1 represents a higher priority to priority P2; thus, in this example, robot R1 is a higher-priority robot than robot R2. Since priority P1 is higher than priority P2, the multi-agent planner can reserve a route RT1 through the environment for the exclusive use of robot R1. As part of reserving reserve route RT1 for the exclusive use of robot R1, robot R1 can have exclusive use of lanes and conflict regions, such as intersections, between lanes on RT1. Thus, robot R1 will not collide with another robot in a conflict region of RT1, since exclusive use of that conflict region is reserved for robot R1.

For example, let the route RT1 include lane L1, and that robot R2 blocks higher-priority robot R1 on lane L1 so that robot R1 cannot travel further along route RT1. Then, the multi-agent planner can instruct robot R2 to travel along the cycle of lanes that includes lane L1, as such, robot R2 will eventually leave lane L1, and then robot R1 can proceed along lane L1 along route RT1. Once robot R1 has traversed lane L1, the multi-agent planner can release the reservation of lane L1 for robot R1 to allow robot R2 back onto lane L1 as necessary.

The multi-agent planner can be implemented using software multi-agent planner executable by one or more computing devices. The multi-agent planner software can include a multi-agent planning algorithm that avoids deadlocks while operating on a roadmap representing an environment including N agents, N≥1. Examples of these agents include, but are not limited to, vehicles and robots (such as mobile robotic devices). The roadmap can include a connected graph that has been annotated with one or more lanes to determine routes for the N agents. A lane is an expected travel path of the roadmap such that an agent on a lane does not conflict with an agent on any other lane. Examples of portions of a roadmap that may not be classified as lanes include turn edges, edges that include a starting position and/or a destination position of an agent's route, and intersection crossings. In some examples, a lane is assumed to be wide enough for only one agent; that is, passing in a lane is not allowed. In particular of these examples, passing can be achieved by use of multiple adjacent, distinct lanes all going in the same direction. However, if there is only one lane L_ONLY directed from point A to point B, and robot R1 is behind robot R2 on lane L_ONLY, the only way R1 can pass R2 is by R1 leaving L_ONLY in doing so, R1 may traverse non-lane space, possibly including traversing a lane L_ANOTHER against its direction, in which case R1 is not considered to be on L_ANOTHER.

At any given time, an agent can either be on a lane or not on a lane, but blocking sufficient area to get to a lane. In other words, an agent is either on a lane or on the way to a lane. When an agent gets off a lane for whatever reason, the multi-agent planner can compute and reserve a task-performance area for the agent to perform a task away from the lane and to allow the agent to get back onto a lane (the same lane or a different one). For example, in case of "pick and place" operations, or operations where the robot gets (picks up) cargo and places the cargo at a destination location, the task-performance area can include a pre-pick edge, area required to perform the pick operation, a post-pick edge, and at least one path from the post-pick edge up to and including a lane edge. In case of intersection crossings, as soon as an agent gets off a lane, the blocked task-performance area can include all edges/lanes forming the intersection. The task-performance area can remain blocked until the agent reaches a lane on the other side. In some cases, the task-performance area may shrink as the agent makes progress through the task-performance area. Note that, in at least some cases, turn edges, pre-pick edges, post-pick edges, and intersection crossings are not lanes.

If a roadmap graph is annotated with lane and non-lane regions, lanes end sufficiently far from intersections, the lane graph is connected, and agent reservations include paths to a lane edge (as described in the previous several paragraphs), then the multi-agent planning problem restricted in such a way can be computationally tractable. Further, the restriction to lanes can be reasonable for many practical planning problems. Then, the solution to the multi-agent planning problem can involve finding routes that can be specified as a collection of one or more edges and/or lanes from a starting location to a destination location which may traverse one or more non-lane regions The multi-agent planner can assign priorities to agents. The priorities can be used to order agents to resolve deadlocks; e.g., agent priorities can be used to specify an order of agents that cross a conflict area. Then, a higher priority agent can reserve paths and cross conflict areas before lower priority agents, and lower priority agents can be instructed to clear the path for the higher priority agent and/or wait for the higher priority agent to pass. In some examples, agent priorities can take monotonically increasing values; e.g., an agent's priority may stay the same or increase, but does not decrease until it completes its task and/or route. An example of a monotonically increasing value is an amount of time an agent has been traveling along its route; e.g., agents that have been on the route the longest have right of way. Another example of a monotonically increasing value for a robot R is a route-start value for a number of robots that have started on their routes since robot R started on its route; e.g., the route-start value for robot R would initially be zero, and as other robots started on their routes, the route-start value increase over time and would not decrease; thus, the route-start value is monotonically increasing. Other monotonically increasing values and/or functions that generate monotonically increasing values suitable for use as priorities are possible as well.

When an agent completes an operation at the destination location and starts moving again, the multi-agent planner can change an area around the destination location from being blocked while the agent is at the destination location to being unblocked, and so make more, and perhaps shorter, paths available for other agents. As such, the estimate of how long the agent will stay at a destination location can limit how long the area around the destination location remains blocked. Then, the multi-agent planner can determine one or more estimates of how long an agent will stay at a destination location. At one extreme, a first estimate can assume that an agent will stay at a destination location forever. At another extreme, a second estimate can assume that an agent will stay at a destination location for a minimal amount of time; e.g., one time unit or less. A historical value can be used to determine an estimated time of an agent at the destination; e.g., if a number of previous agents took an average of X time units to complete an operation O1, and agent A1 is attempting to complete operation O1, then A1 can be estimated to take X time units to complete operation O1. In still another example, the multi-agent planner can provide an estimate of how long an agent will stay at a destination location via a user interface; e.g., as an argument to a command line, via a graphical user interface (GUI), by way of a web browser, etc. An example method of blocking locations for agents is described below in the context of FIG. 8. Other estimates of agent locations are possible as well.

An agent can have its priority reset, e.g., to a zero or other lowest-priority value, when it completes its route. In some examples, an agent can be considered to have completed a route when the agent reaches the destination location. In other examples, an agent can be considered to have completed a route when the agent completes part or all of an operation, such as a pick and place operation, at the destination location. Then, after the agent finishes its current operation, the multi-agent planner can reset the priority of the agent. Since the agent reserves enough area to get back onto a lane, the agent already has enough room to maneuver to allow other agents to pass by. Upon reset of priority, an agent R1 that just completed an operation becomes a low priority agent. Then, R1 can be instructed by the multi-agent planner to get out of the way and/or wait out of the way of one or more higher-priority agents R2 . . . Rn. Before the priority reset of agent R1, agents R2 . . . Rn were instructed to clear path for agent R1. After the priority reset of agent R1, at least one of the agents R2 . . . Rn can reach its destination location, perhaps by altering the route of agent R1 to avoid blocking a route of one or more of agents R2 . . . Rn. As agent R1 proceeds along a route, R1's priority increases so that R1 becomes a relatively-high priority agent and one or more lower-priority agents R3 . . . Rm can be instructed to get out of the way and/or wait out of the way of R1's route. Once R1 reaches its destination, R1's priority can be reset. An example priority cycle of agents whose priorities increase along a route until reaching a destination is discussed below in the context of FIG. 9.

A conflict region is a location between lanes, such as an intersection or portion of the roadmap that has not been annotated with lanes. If two lanes A and B are separated by a conflict region, a non-lane path (or edge) through the conflict region can connect lanes A and B, where any path not classified as a lane can be termed as non-lane path. As examples, a bi-directional path is a non-lane path, or a path that could lead an agent into conflict with another agent is a non-lane path. In some examples, the roadmap can have lanes and conflict regions. In some of these examples, a condition C can exist for a roadmap R having at least two lanes; e.g., lane A and lane B. For example, let lane A and lane B are connected by non-lane path NLP1 that traverses a conflict region CR1 between lanes A and B. Then, condition C can exist in roadmap R when: for each lane L1 in conflict region CR1 traversed by NLP1, there is a lane-only path to either the start of a path NLP1 or out of the conflict region. An example of a conflict region like CR1 is discussed below in the context of conflict region 250 in the lower portion of FIG. 2.

For roadmaps that meet condition C, a tractable solution to avoid deadlocks in multi-agent route planning can be obtained. By restricting the NP-hard multi-agent planning problem to a planning problem that uses lane-based roadmaps, the resulting restricted problem can be computationally tractable. Further, the restriction to lanes can be reasonable for many practical planning problems. Then, the solution to the multi-agent planning problem can involve finding routes that can be specified as a collection of one or more edges and/or lanes from a starting location to a destination location which may traverse one or more conflict regions.

The multi-agent planner can receive and use a roadmap R of an existing environment for multi-agent planning, where R can be a directed connected graph of M lanes, M>0, used by a number N, N>0, of agents, where N can be small enough so that, in a starting configuration, on every lane there is enough room to fit at least one more agent, or, in some related cases, N is chosen so that enough room to fit at least one more agent on every cycle of lanes in the roadmap. M and N can be chosen so that there is at least one region in the roadmap large enough for an agent to perform an operation, such as a pick and place operation.

Using roadmap R, the multi-agent planner can route an agent A1 from its current location CL on a lane to another location AL on the same or another lane. Since roadmap R is a connected graph, there is a cycle of lanes CY between CL and AL. As stated in the previous paragraph, there is at least one empty spot on CY. By moving agents around CY between CL and AL, the multi-agent planner can move the empty spot with the agents until agent A1 reaches location AL. Moving agents around cycles of lanes is discussed below in more detail; e.g., in the context of robot 330 of scenario 300 shown in FIG. 3 and robot 530 of scenario 500 shown in FIGS. 5A-5F. Even if all N agents happen to be on CY, agent A1 can be moved to AL in polynomial time. In the end of this circular shift, there is still at least one empty spot per cycle. After agent A1 is done at location AL, the multi-agent planner can reset the priority of agent A and another agent A2 can be selected; e.g., based on the relatively-high priority of agent A2, and agent A2 can be routed in a similar fashion as agent A1. This circular shift algorithm demonstrates that the combination of restriction of lane-based graphs and priority ordering of agents is sufficient to reduce the general multi-agent planning problem to a problem that can be solved in polynomial time by the multi-agent planner without deadlocks.

In general, a roadmap R1 can be a connected graph having both lane and non-lane edges. Whenever an agent needs to get off a lane, the agent can reserve a hyperedge, or a sequence of edges ending on a lane treated as a whole for the purposes of conflict determination. By considering non-lane edges as part of hyperedges between lanes, the general lane-enabled graph R1 can be treated as a lane-only graph, so the general multi-agent planning problem on roadmap R1 can also be solved in polynomial time without deadlocks.

Given initial locations and required destinations for all agents, the multi-agent planner assigns priorities to all agents as described above. Then the multi-agent planner constructs a solution for all N agents. The solution specifies for each agent a sequence of hyperedges with corresponding finish times. The solution is constructed such that all agents reach their destinations without deadlocks and in a polynomially bounded amount of time. In some cases, lower priority agents may be instructed to take detours to allow higher priority agents to pass. The lower-priority agents are then instructed to proceed to their goal locations. In some cases higher priority agents are instructed to wait for lower priority agents to get out of the higher priority agents' way.

In some examples, the multi-agent planner can plan for each of the N agents in priority order. For each agent, the multi-agent planner can determine a route from its starting or current location to its destination location while respecting plans of all previous (higher-priority) agents, but possibly going over locations of following (lower-priority) agents. The beginning of an agent's route, starting with edges from the partial plan, can be committed. Once a route of an agent goes over last location of a following agent, the route can become tentative. As such, the multi-agent planner can ensure the first agent in priority order A_HIGHEST_PRI can be routed to its destination, since A_HIGHEST_PRI is routed before all other agents. The route for A_HIGHEST_PRI can be considered to be finite path in 3D (2D plane+1D time) at the end of which, the priority for agent A_HIGHEST_PRI is reset.

The multi-agent planner plans routes for each following agent "under" the 3D paths of the previous agents. A route for an agent can completely fit under the paths of previous agents, including a wait and a priority reset at the destination location. In some cases, a route for an agent can include routing for an escape, or a hyperedge for getting out of the way of a higher priority agent, and subsequently waiting for a priority reset for a previously-routed agent, and then cycling back to undo the escape. In an extreme case, an agent can escape a bounded number of times (i.e., the number of higher-priority agents). After these escapes have been performed, all higher-priority agents will have their respective priorities reset, leaving the agent with a relatively-high priority that enables it to proceed along its route to its destination location.

An agent can stay at a destination location for a period of time to complete any operations required at the destination location as a relatively-high priority agent, and then the agent's priority can be reset. For example, the relatively-high priority agent can disappear from planning and a new lowest-priority agent can appear at the same location. In some examples, the new lowest-priority agent is not initially assigned a task, and so is not subject to route planning until the agent has been assigned a task. As such, the new lowest-priority agent is only planned with respect to conflict checks; that is, to ensure the new lowest-priority agent is not blocking the route of a higher priority agent. In this case, the new lowest-priority agent is assumed to escape a higher priority agent. In some examples, all agents can be assumed to operate at the same speed, implying that no agents can pass each other—thus, escape may be the only way to get around a blocking agent. In other examples, this same-speed assumption can be relaxed, which may allow passing of agents.

In operation, a roadmap can have one or more lanes get blocked; e.g., by obstacles, by agents needing maintenance, etc. Lane blockage can lead to partitioning of a roadmap; e.g., if two portions of a roadmap P1 and P2 are connected by one lane L1, and lane L1 gets blocked, the roadmap will be partitioned into portions (now partitions) P1 and P2. If such blockages (or other reasons) cause a roadmap to be partitioned and isolating an agent's A_BLOCK starting location from its destination location, the multi-agent planner can determine there is no route for agent A_BLOCK, even if no other agents are considered. In this case, the multi-agent planner can raise an exception to indicate there is a problem in routing agent A_BLOCK. As a reaction to that exception, agent A_BLOCK can be assigned to a new task that stays within a connected portion of the roadmap (e.g., if A_BLOCK was in portion P2 when the roadmap was partitioned, A_BLOCK can be assigned to a new task whose route is within P2) and/or some areas of the roadmap, such as areas near blocked lane L1, can be declared as blocked or obstructed. Unless otherwise indicated, a roadmap used by the multi-agent planner is assumed to be connected.

If an agent is directed to get out of the way of one or more higher-priority agents, the agent may revisit the same location several times on one route. To distinguish such behavior from a wasteful cyclic route, an agent A_LOPRI is allowed to revisit lane L1 (or edge E1) if higher priority agent A_HIPRI is assigned to travel on lane L1 (edge E1) sometime in the future. In some cases, agent A_LOPRI can be allowed to visit lane L1 (edge E1) up to the number of higher-priority agents plus one time; e.g., if A_LOPRI is the $10^{th}$ highest priority agent, A_LOPRI can visit lane L1 (edge E1) nine times for escapes plus one time for its own purposes, so A_LOPRI can visit lane L1 (edge E1) a total of 10 times.

The multi-agent planner can provide a plan for agents traversing hyperedges of a roadmap. After the multi-agent planner determines a route for each agent in priority order, as discussed above, a collection of N time-ordered sequences of hyperedges—one for each agent—are generated. The hyperedges can be considered in order of their completion times. Then, the plan can be built starting with the first completed hyperedge such that each added edge does not conflict with any edges already in the plan for other agents.

In general, multi-agent planning is an NP-hard problem, due to the need to order agents around crossing conflicting agents, and so arriving at an optimal solution that avoids deadlocks is unlikely to be possible in polynomial time. However, multi-agent planning algorithms that route robots can avoid conflicts and/or deadlocks between the robots. Further, as discussed above, such multi-agent planning algorithms that utilize connected graphs involving lanes and monotonically increasing priorities for agents, such as agent priorities based on an amount of time an agent has been traveling along its route, can be computationally tractable. Thus, the herein-described techniques can enable computationally tractable solutions to multi-agent planning problems using roadmaps having lane-related restrictions that are workable in a number of examples, such as routing robots in an environment, such as a warehouse environment.

Using Lane-Annotated Roadmaps for Deadlock-Free Multi-Agent Planning

Figure 2:
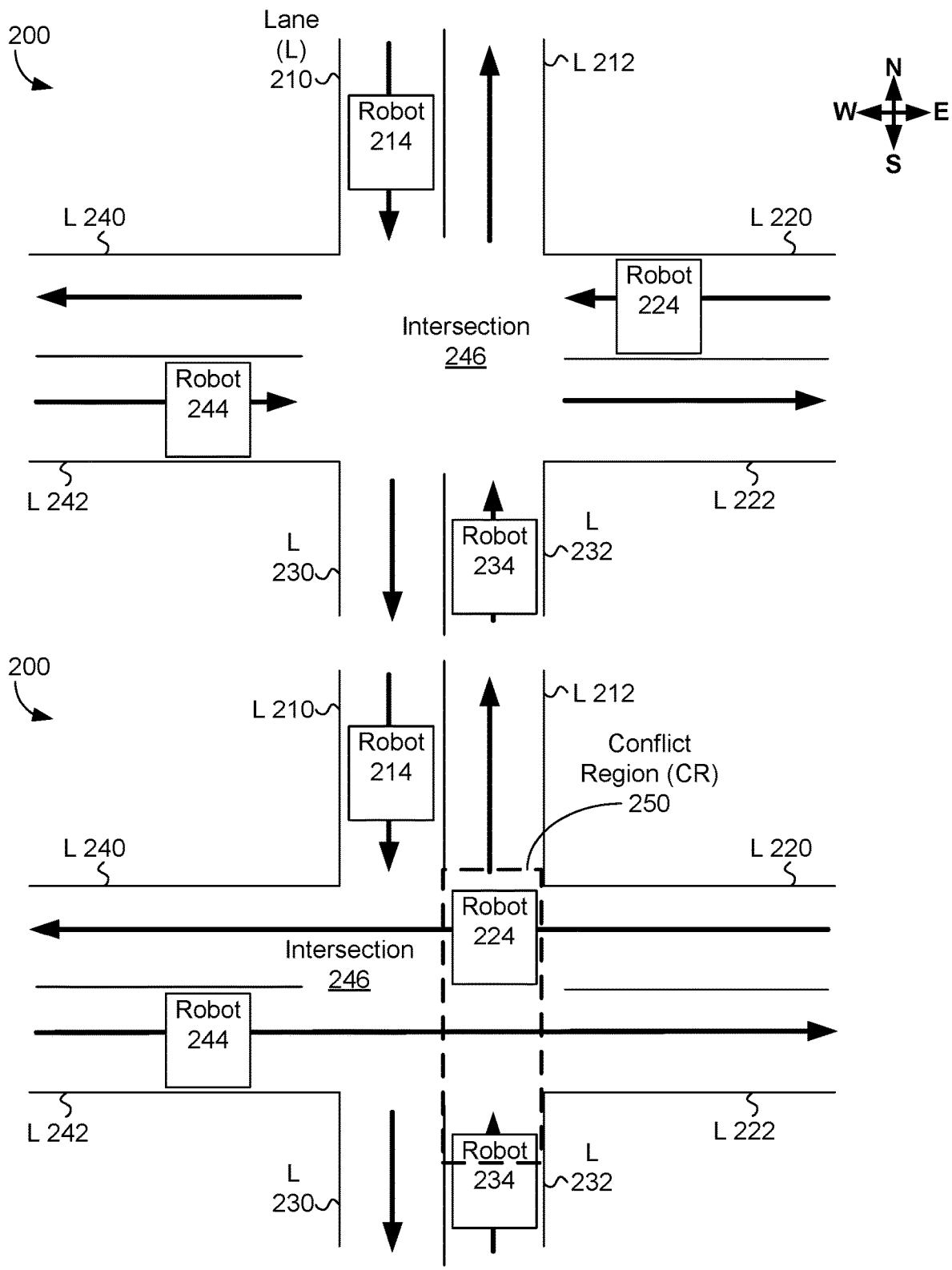
FIG. 2 shows a scenario involving four robots at an intersection of unidirectional lanes, in accordance with an example embodiment.

FIG. 2 shows scenario 200 involving four robots 214, 224, 234, 244 at intersection 246 of unidirectional lanes (Ls) 210, 212, 220, 222, 230, 232, 240, 242, in accordance with an example embodiment. An upper portion of FIG. 2 shows robot 214 on lane 210 that is directed from north to south, robot 224 on lane 220 that is directed from east to west, robot 234 on lane 232 that is directed from south to north, and robot 244 on lane 242 that is directed from west to east. Lane 210 is paralleled by lane 212 directed from south to north, lane 220 is paralleled by lane 222 directed from west to east, lane 232 is paralleled by lane 230 directed from north to south, and lane 242 is paralleled by lane 220 directed from east to west.

As shown at a lower portion of FIG. 2, scenario 200 continues with robot 224 continuing into intersection 246, which now includes conflict region (CR) 250. A conflict region can be a region between lanes; e.g., a lane A and a lane B, where there is a lane-only path to either (i) the start of a path between lane A and lane B or (ii) out of the conflict region. For the first of these two conditions, the lower portion of FIG. 2 shows that a path from lane 232 to lane 222 includes lane 232 that is a start of the path between lanes 232 and 222 in conflict region 250. For the second of these two conditions the lower portion of FIG. 2 shows that a lane-only path extending from lane 220 through to lane 240 passes through and out of conflict region 250, as well as a lane-only path extending from lane 242 through to lane 222 passes through and out of conflict region 250. Note that intersection 246 can include multiple conflict regions at the same time; e.g., intersection 246 can include conflict region 250 and a parallel conflict region between lanes 210 and 230. That is, an intersection can be an example of one or more conflict regions, but conflict regions can differ from intersections. As another example of a conflict region differing from an intersection, a conflict region can include a portion of a roadmap that is not annotated by lanes and includes several intersections, such as example roadmap 720 shown in FIGS. 7A-7D. Other examples of conflict regions are possible as well.

Figure 3:
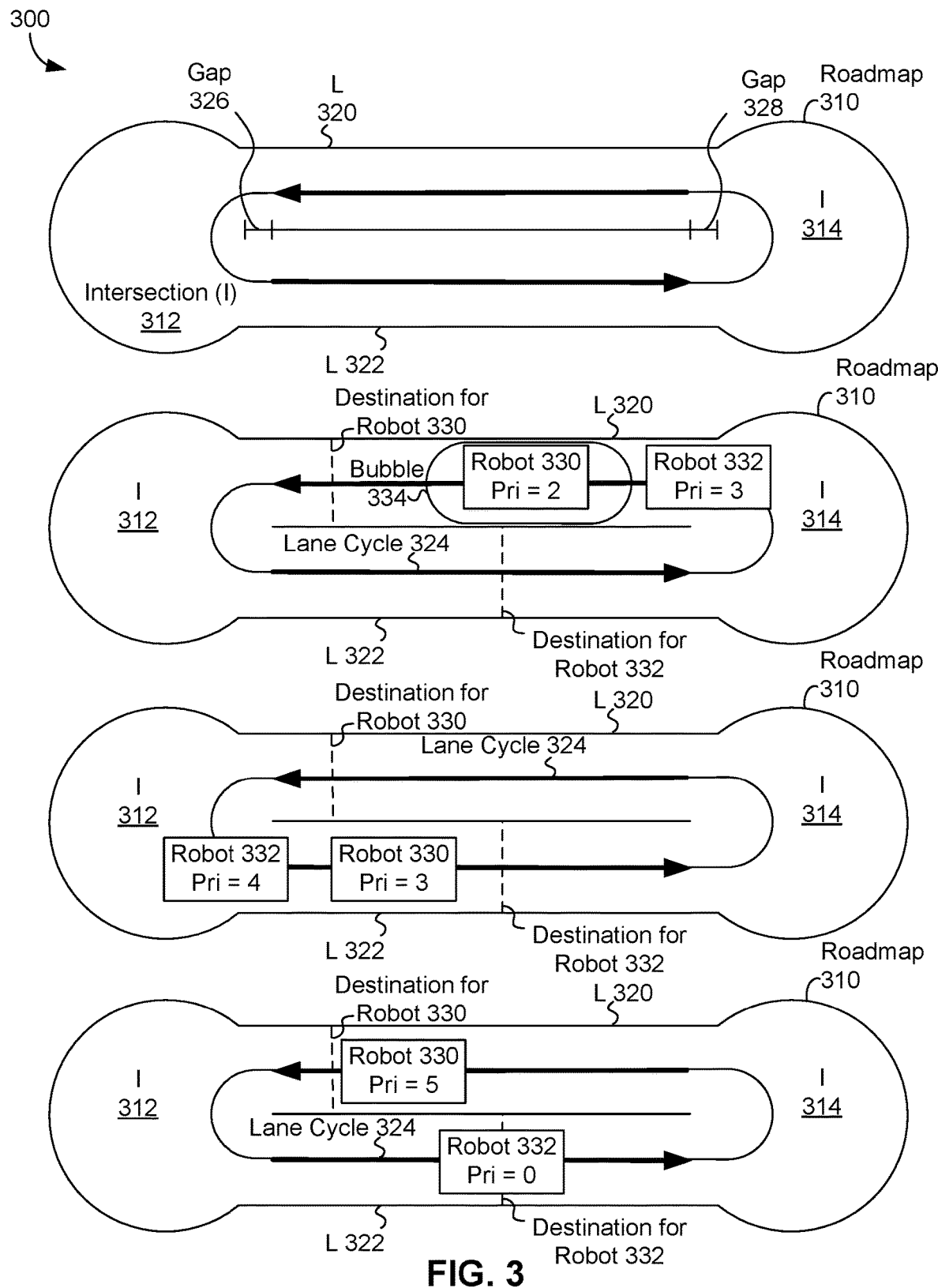
FIG. 3 shows a scenario involving two robots at a cycle of lanes, in accordance with an example embodiment.

FIG. 3 shows scenario 300 involving two robots 330, 332 using a cycle of lanes, in accordance with an example embodiment. An uppermost portion of FIG. 3 shows roadmap 310 having lane cycle 324 including lanes 320 and 322 that are connected via intersections (Is) 312 and 314. Roadmap 310 can be a roadmap of an existing environment that includes robots 330, 332. Each of lanes 320 and 324 stop before reaching respective gaps 326 and 328, where gaps 326 and 328 allow a robot stopped at an end of respective lanes 320 and 322 from interfering with robots moving through respective intersections 312 and 314.

A second from uppermost portion of FIG. 3 shows lane cycle 324 of roadmap 310 partially occupied by two robots 330, 332 both directed by a multi-agent planner to travel from east to west on lane 320. In scenario 300, the multi-agent planner determines priorities for a robot based on an amount of time the robot has been traveling along its route. At this stage of scenario 300, robot 330 has a current priority of two as indicated in FIG. 3 by "Pri=2", and robot 332 has a current priority of three as indicated in FIG. 3 by "Pri=3". Thus, robot 332 has a higher priority than robot 330 which indicates robot 332 has been traveling along its route longer than robot 330.

As there are only two robots in the environment of scenario 300, the priority of robot 332 is the highest priority over all robots in the environment. Then, after determining that the priority of robot 332 is the highest priority, the multi-agent planner can reserve the route including lane 320, intersection 312, and lane 322 for use by robot 332 so that robot 332 can reach its destination on lane 322.

The second from uppermost portion of FIG. 3 also shows that a destination for robot 330 is near a western end of lane 320, while the destination for robot 332 is near the center of lane 322. That is, lower-priority robot 330 is relatively near to its destination while higher-priority robot 332 is relatively far from its destination. However, if lower-priority robot 330 stopped at its destination (or elsewhere on lane cycle 324 of roadmap 310 before robot 332 reached its destination), it would block lane 320 (or perhaps lane 322) so that higher-priority robot 332 could not reach its destination. To enable higher-priority robot 332 to proceed to its destination, the multi-agent planner instructs lower-priority robot 330 to travel through lane cycle 324 before stopping at its destination so that robot 330 does not block robot 332.

The second from uppermost portion of FIG. 3 also shows that lane cycle 324 of roadmap 310 includes space sufficient for each of robots 330 and 332 plus space sufficient for at least one additional robot (not shown in FIG. 3). Further, lane cycle 324 includes space sufficient to maintain a minimum following distance between robots—this minimum following distance is represented by bubble 334 around robot 330, where bubble 334 is a region of space reserved for robot 330 to avoid collisions between robot 330 and other agents/robots. In other scenarios, a similar bubble of space can be provided for robot 332.

Scenario 300 proceeds with lower-priority robot 330 going past its destination so that it does not block lane 320 while higher-priority robot 332 proceeds to its destination on lane 322, as shown in a second from lowermost portion of FIG. 3. As both robots 330 and 332 have spent more time on the route, the multi-agent planner increases the priorities of both robots to three and four respectively.

A lowermost portion of FIG. 3 shows that robot 332 has stopped at its destination as instructed by the multi-agent planner and the multi-agent planner reset robot 332's priority to 0 after arrival at its destination. Also, the multi-agent planner has instructed robot 330 to proceed along lanes 322 and 320 of lane cycle 324 via intersection 314 to approach its destination. While traveling along lanes 322 and 320 of lane cycle 324 and through intersection 314, the multi-agent planner has increased the priority of robot 330 to five. Once robot 330 reaches its destination, the multi-agent planner can instruct robot 330 to stop at its destination and scenario 300 can be completed.

Robots can be rerouted when obstacles, such as cargo, unauthorized agents, unauthorized people, and/or inoperative machinery, are found along a route. In such scenarios, when the multi-agent planner determines that an obstacle is on a route that blocks a robot, such as an obstacle on lane 320 that blocks robot 330 and/or 332, the multi-agent planner can generate a warning message indicating the presence of the obstacle; and determining new routes for robots whose routes are blocked by the obstacle. For example, if the multi-agent planner determined that an obstacle blocked lane 320, while robot 332 was in intersection 314 during scenario 300, then the route of robot 330 may be affected by the obstacle, but the route of robot 332 would not be affected (since robot 332 only needs to clear intersection 314 and travel along lane 332 to reach its destination). If the route of robot 330 was affected by the obstacle, then the multi-agent planner can re-route robot 332, generate a warning message and/or other indications that an obstacle has been detected on lane 320, send a request for a human or other agent to inspect lane 320 for the obstacle, and/or perform other actions to try to work around and/or clear the obstacle.

FIGS. 4A-4E show a scenario 400 involving robots turning at intersection 450, in accordance with an example embodiment. Scenario 400 has two phases, both involving traversals of intersection 450. In a first phase of scenario 400, shown in FIG. 4A, a multi-agent planner directing robots 414, 424, 436, and 446 to make respective right turns through intersection 450. In a second phase of scenario 400, shown in FIGS. 4B, 4C, 4D, and 4E, the multi-agent planner directs robots 470, 472, 474, and 476 to make respective left turns through intersection 450.

Figure 4A:
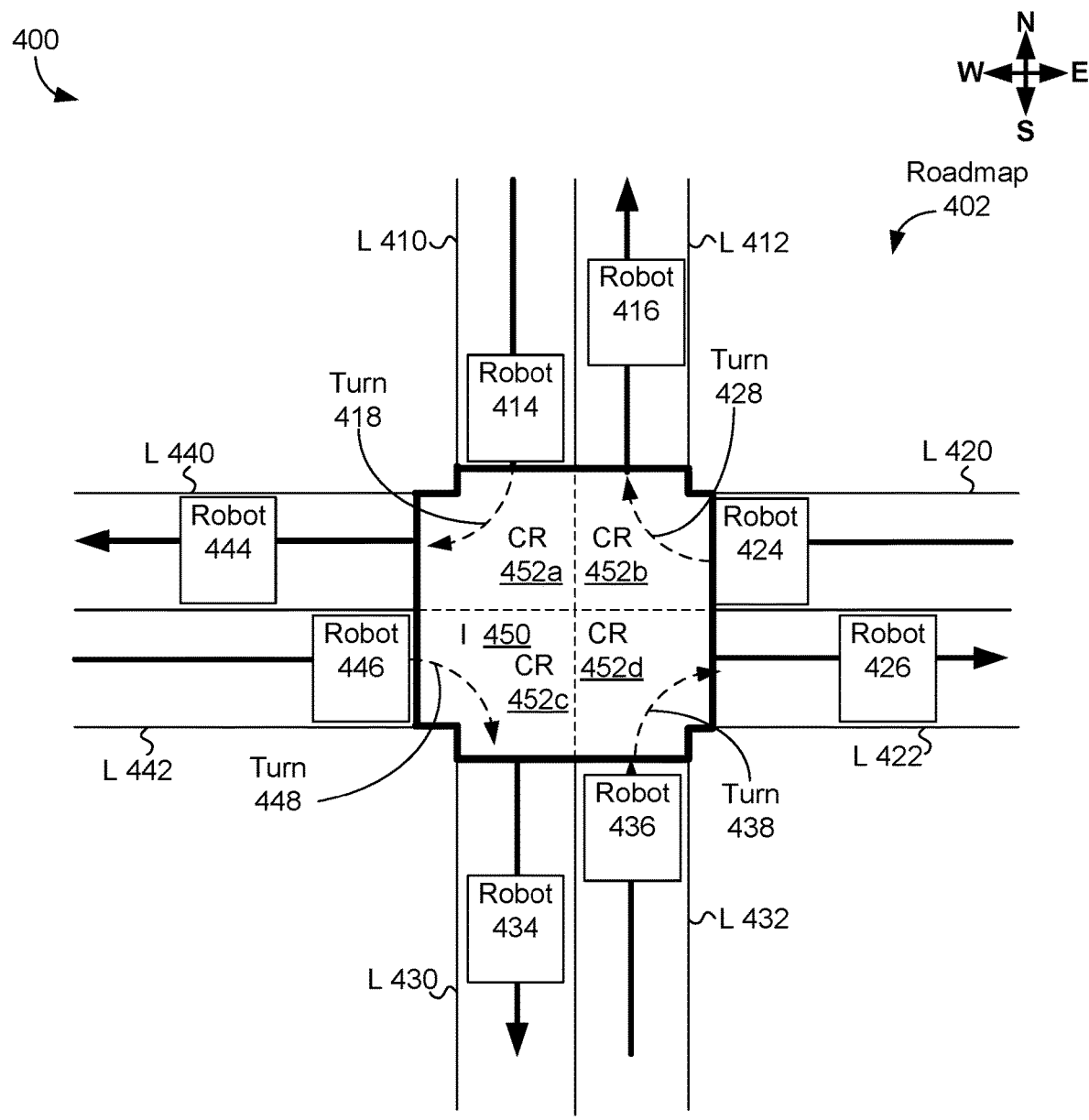
FIGS. 4A-4E show a scenario involving robots turning at an intersection, in accordance with an example embodiment.

FIG. 4A shows roadmap 402 with intersection 450 of eight lanes—lane 410 entering intersection 450 from the north, lane 412 leaving intersection 450 toward the north, lane 420 entering intersection 450 from the east, lane 422 leaving intersection 450 toward the east, lane 432 entering intersection 450 from the south, lane 430 leaving intersection 450 toward the south, lane 442 entering intersection 450 from the west, and lane 440 leaving intersection 450 toward the west. The environment represented by roadmap 402 in FIG. 4A for the first phase of scenario 400 includes eight robots—robot 414 on lane 410, robot 416 on lane 412, robot 424 on lane 420, robot 426 on lane 422, robot 434 on lane 430, robot 436 on lane 432, robot 444 on lane 440, and robot 446 on lane 442.

Of these eight robots, four robots—robots 414, 424, 436, and 446—are directed to perform turns through intersection 450 by the multi-agent planner during the first phase of scenario 400. In the first phase of scenario 400, intersection 450 can be divided into four conflict regions: conflict region 452a connecting lanes 410 and 440, conflict region 452b connecting lanes 420 and 412, conflict region 452c connecting lanes 442 and 430, and conflict region 452d connecting lanes 432 and 422.

Scenario 400 proceeds with the multi-agent planner directing robot 414 to make right turn 418 from lane 410 to lane 440. To perform this right turn, the multi-agent planner reserves conflict region 452a for robot 414, and directs robot 414 to proceed through the portion of intersection 450 that includes conflict region 452a to make right turn 418 onto lane 440. As intersection 450 does not include any lanes, at least a portion of intersection 450; e.g., conflict region 452a, has to be reserved to block other robots from entering the portion of intersection 450 between lanes 410 and 440.

Similarly, each of robots 424, 436, and 446 are performing respective right turns 428, 438, 448 from respective lanes 420, 432, 442 to respective lanes 412, 422, 430 as directed by the multi-agent planner. To perform these right turns, the multi-agent planner reserves conflict region 452b for robot 424, reserves conflict region 452d for robot 436, and reserves conflict region 452c for robot 446. As mentioned above, since intersection 450 does not include any lanes, at least a portion of intersection 450; e.g., conflict regions 452b, 452c, 452d have to be reserved to block other robots from entering the portion of intersection 450 to enable turns 428, 438, and 448 between respective lanes 420 and 412, lanes 432 and 422, and lanes 442 and 430. Then, robots 424, 436, 446 proceed through respective portions of intersection 450 that include respective conflict regions 452b, 452d, 452c to make respective right turns 428, 438, 448 onto respective lanes 412, 422, 430. As none of conflict regions 452a, 452b, 452c, 452d overlap, some or all of turns 418, 428, 438, 448 can be carried out in parallel.

In other scenarios, the shapes of some or all of conflict regions 452a, 452b, 452c, 452d can be different than shown in FIG. 4A. For example, some or all of conflict regions 452a-452d can be reduced in size so that each of conflict regions 452a-452d allow a right turn between lanes but do not cover a center of intersection 450.

Figure 4B:
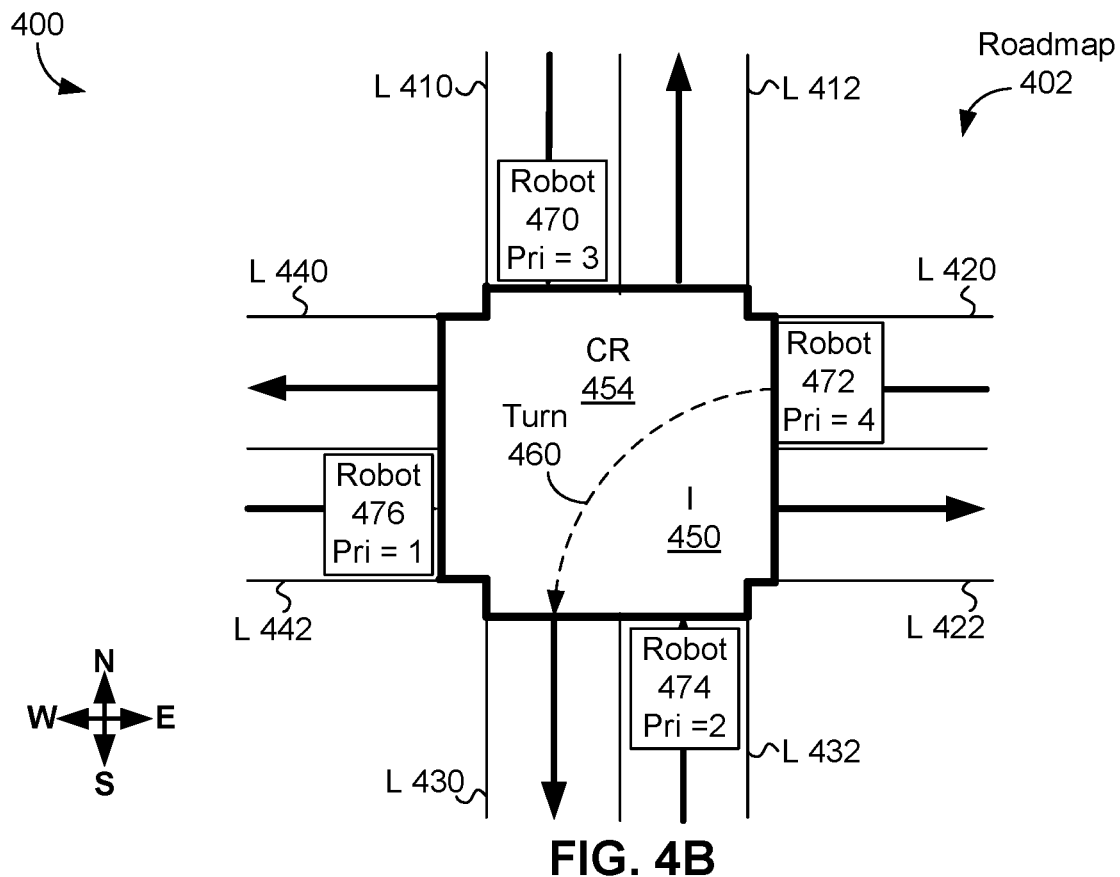

In the second phase of scenario 400, robots 470, 472, 474, and 476 are directed by the multi-agent planner to make left turns through intersection 450, as shown in FIGS. 4B, 4C, 4D, and 4E. The environment for the second phase of scenario 400 is represented by roadmap 402 in FIGS. 4B-4E and includes four robots: robot 470, robot 472, robot 474, and robot 476. FIG. 4B shows that, at this stage of scenario 400, four robots are just outside intersection 450: robot 470 in lane 410, robot 472 in lane 420, robot 474 in lane 432, and robot 476 in lane 442. During at least the second phase of scenario 400, the multi-agent planner determines priorities for a robot based on an amount of time the robot has been traveling along its route. In particular, multi-agent planner has assigned priorities to robots 470-476 as follows: robot 470 has a priority of three, robot 472 has a priority of four, robot 474 has a priority of two, and robot 476 has a priority of one. As such, robot 472 has the highest priority of these four robots.

Scenario 400 continues with the multi-agent planner directing robots 470, 472, and 474 to stop outside of conflict region 454, which is outlined in FIGS. 4B-4E using thick black lines, where conflict region 454 includes intersection 450. The multi-agent planner stops robots 470, 474, and 476 outside of conflict region 454 as each of their respective priorities are lower than the priority of robot 472, so that robots 470, 474, and 476 wait at least until robot 472 has traversed conflict region 454. As robot 472 has the highest priority of the robots at conflict region 454, the multi-agent planner reserves conflict region 454 for the exclusive use of robot 472, and then instructs robot 472 to make left turn 460 from lane 420 through conflict region 454 to lane 430. As conflict region 454 does not have any lanes, conflict region 454 has to be reserved to block robots 470, 474, and 476 from entering while robot 472 travels between lanes 420 and 430.

Figure 4C:
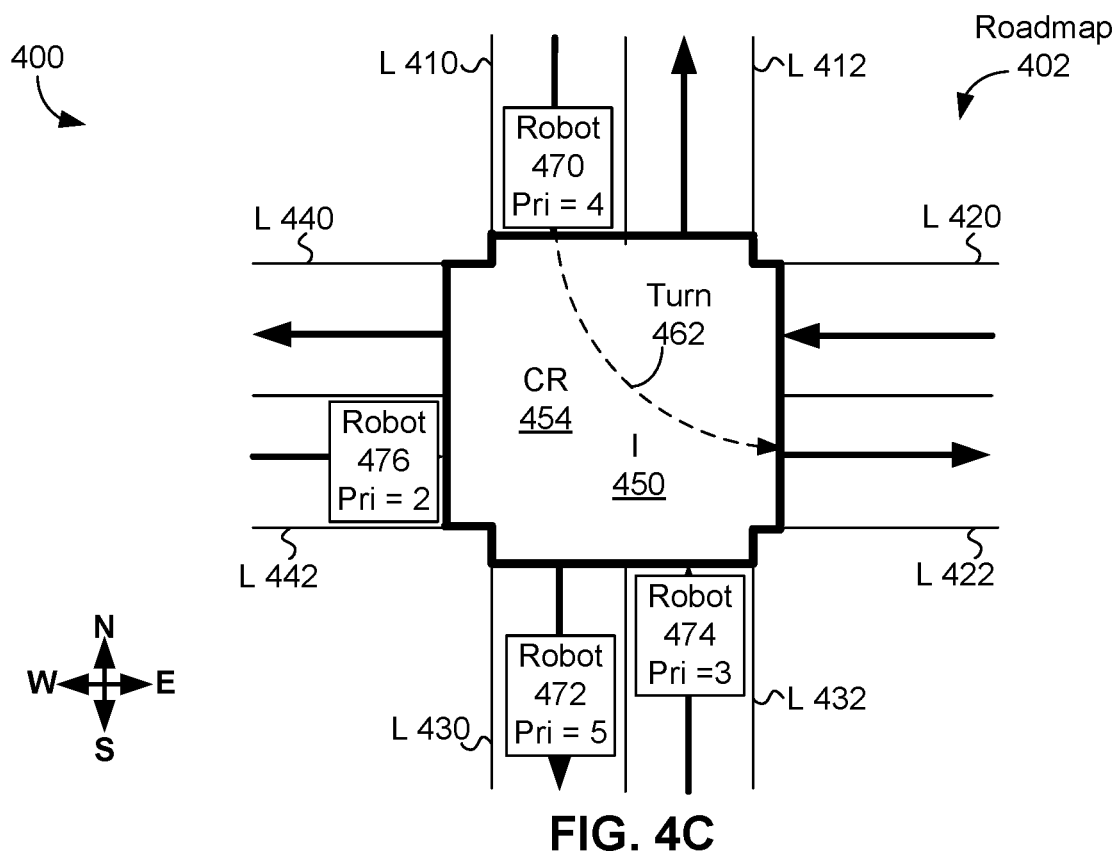

As shown in FIG. 4C, scenario 400 continues with robot 472 having completed left turn 460 and continuing southward in lane 430. The multi-agent planner updates the priorities of robots 470, 472, 474, and 476 to respective values of four, five, three, and two. As robot 470 has the highest priority of the three robots waiting to use conflict region 454 (robots 470, 474, and 476), the multi-agent planner reserves conflict region 454 for the exclusive use of robot 470, and then instructs robot 470 to make left turn 462 from lane 410 through conflict region 454 to lane 422. As conflict region 454 does not have any lanes, conflict region 454 has to be reserved to block robots 474 and 476 from entering while robot 470 travels between lanes 410 and 422.

Figure 4D:
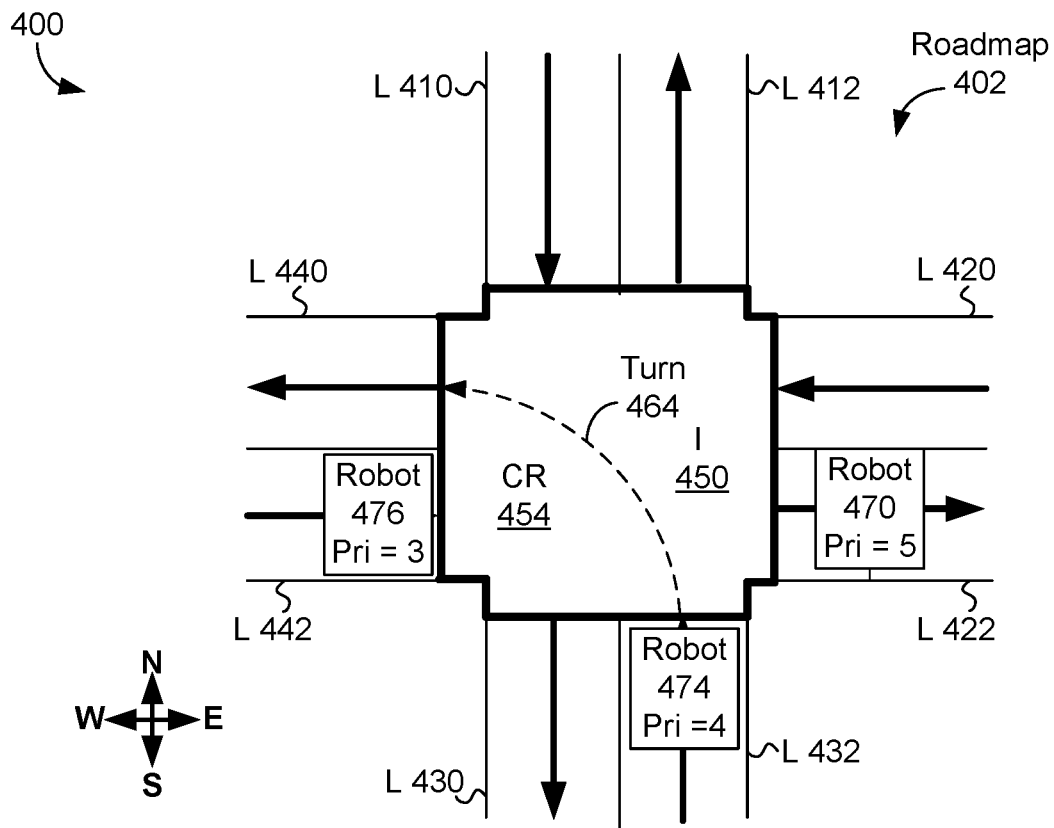

Turning to FIG. 4D, scenario 400 continues with robot 470 having completed left turn 462 and continuing eastward on lane 422. The multi-agent planner updates the priorities of at least robots 470, 474, and 476 to respective values of five, four, and three. As robot 474 has the highest priority of the two robots waiting to use conflict region 454 (robots 474 and 476), the multi-agent planner reserves conflict region 454 for the exclusive use of robot 474, and then instructs robot 474 to make left turn 464 from lane 432 through conflict region 454 to lane 440. As conflict region 454 does not have any lanes, conflict region 454 has to be reserved to block robot 476 from entering while robot 474 travels between lanes 432 and 440.

Figure 4E:
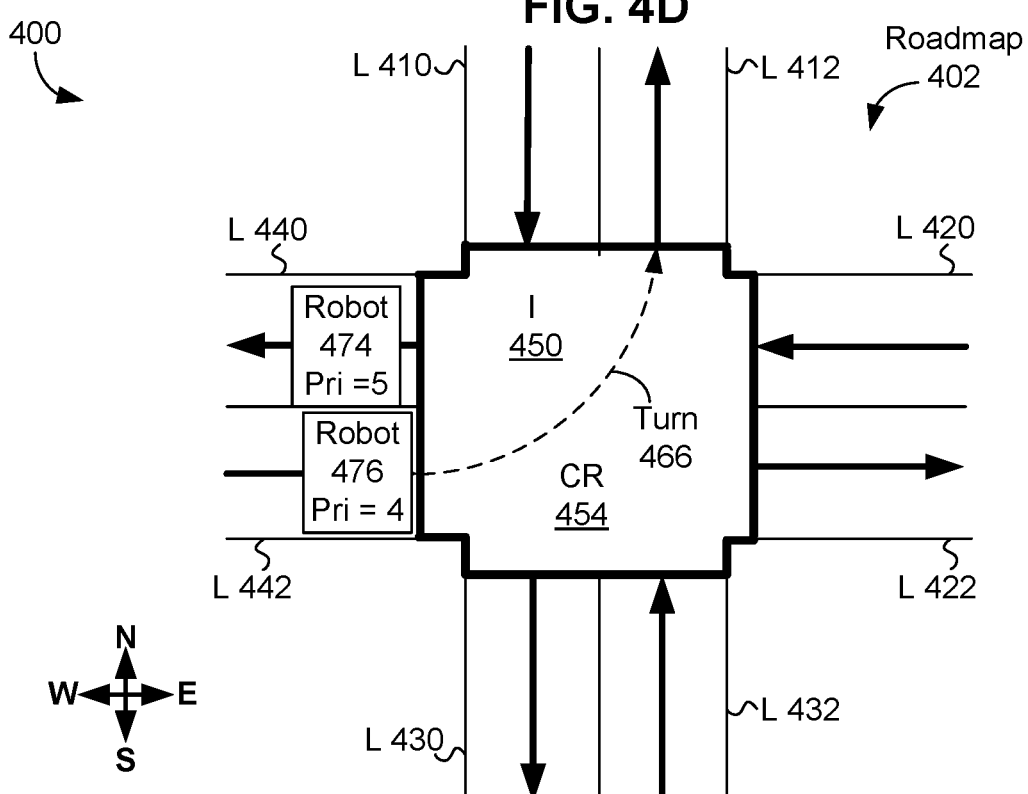

As shown in FIG. 4E, scenario 400 continues with robot 474 having completed left turn 464 and continuing westward on lane 440. The multi-agent planner updates the priorities of at least robots 474 and 476 to respective values of five and four. As robot 476 is the highest-priority robot waiting to use conflict region 454, the multi-agent planner reserves conflict region 454 for the exclusive use of robot 476, and then instructs robot 476 to make left turn 466 from lane 442 through conflict region 454 to lane 412. As conflict region 454 does not have any lanes, conflict region 454 has to be reserved to block any other robots from entering while robot 476 travels between lanes 442 and 412. Upon completion of left turn 466, the multi-agent planner can remove the reservation of conflict region 454 for robot 476, robot 476 can proceed northward on lane 412, and scenario 400 can be completed.

The second phase of scenario 400 mirrors scenario 100, where four robots at an intersection of four edges attempted to make respective left turns, but ended up in a deadlock state. In contrast, all four of the robots in the second phase of scenario 400 made successful left turns without deadlock as discussed above. Thus, the second phase of scenario 400 illustrates that a multi-level planner directing prioritized robots based on a roadmap of unidirectional edges can avoid at least some previously-unavoidable deadlocks.

In some other scenarios, a blocked region can be at least partially released behind an agent as the agent traversed the blocked region. For example, once robot 476 has traveled north of lanes 422 and 442 while making turn 466, a portion of conflict region 454 south of a dividing line between lanes 440 and 442 (and/or a dividing line between lanes 420 and 440) could be released, while the portion of conflict region 454 north of that dividing line could remain blocked/reserved for robot 476. In releasing the portion of conflict region 454 south of the dividing line, some right turns and traversals of intersection 450 could take place while robot 476 finishes making left turn 466, and thus allowing additional traffic flow while maintaining safety as one or more robots travel between lanes.

Figure 5A:
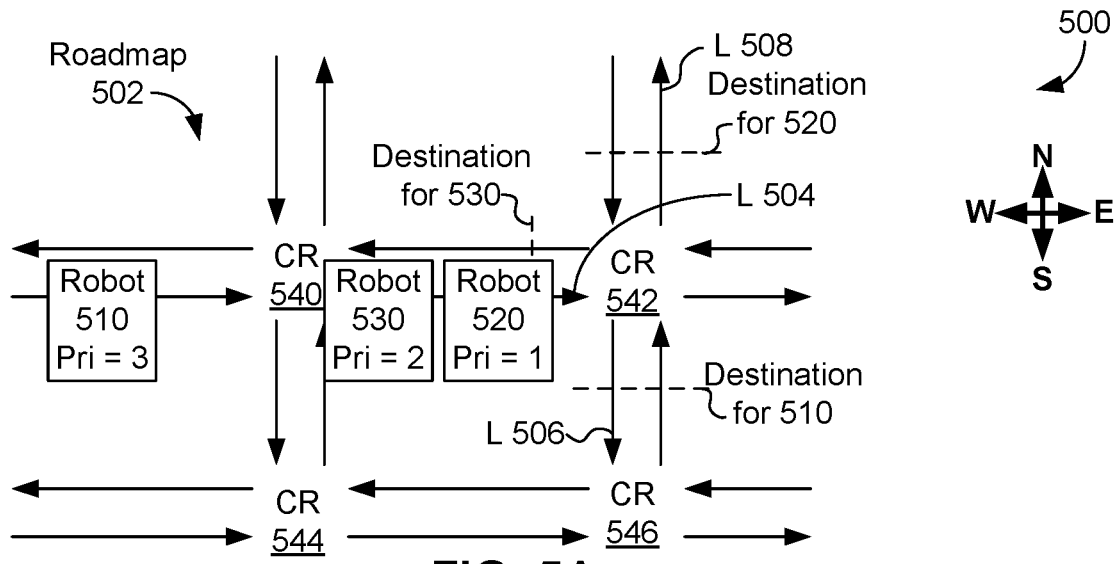
FIGS. 5A-5F show a scenario involving robots navigating in an environment having a plurality of lanes, in accordance with an example embodiment.
Figure 5B:
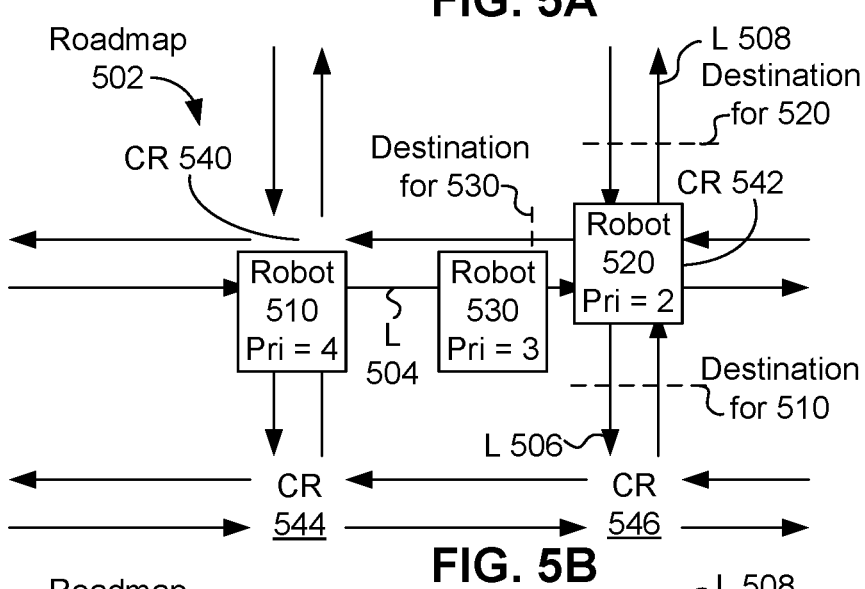
Figure 5C:
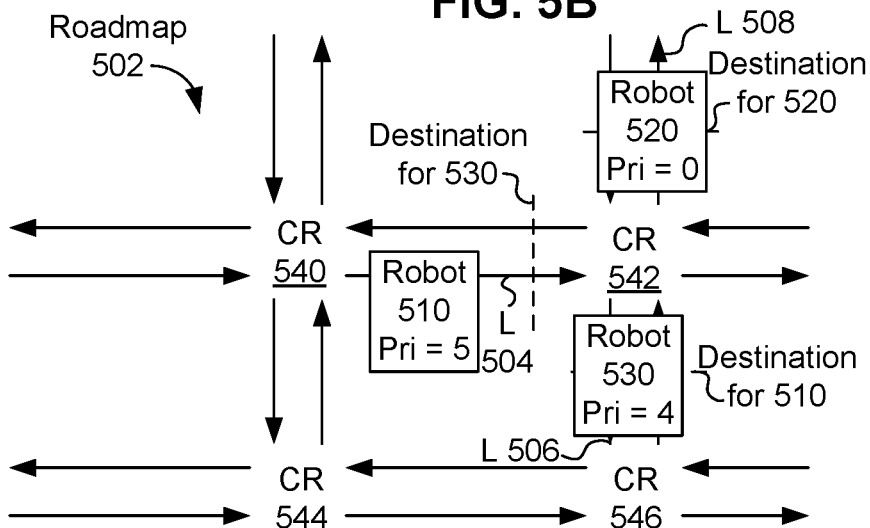

FIGS. 5A-5F show scenario 500 involving robots navigating in an environment having a plurality of lanes, in accordance with an example embodiment. In scenario 500, an environment represented by roadmap 502, has robots 510, 520, and 530 each routed to their respective destinations by a multi-agent planner, and having respective priorities of three, one, and two. As robot 510 has the highest priority of these three robots, the multi-agent planner reserves lane 504 between conflict regions 540 and 542 for the exclusive use of robot 510, as shown in FIG. 5A. Robot 520, even though it has a lower priority than robot 510, can utilize a portion of lane 504 to reach its destination before robot 510 can reach the position of robot 520. Therefore, the multi-agent planner allows robot 520 to proceed to its destination regardless of its relatively low priority, as shown in FIGS. 5B and 5C. In particular, the multi-agent planner releases the reservation of conflict region 542 for the exclusive use of robot 510, reserves conflict region 542 for the exclusive use of robot 520, instructs robot 520 to through conflict region 542 onto lane 508, and releases the reservation of conflict region 542.

As also seen in FIGS. 5B and 5C, robot 530 is directed by the multi-agent planner to go past its destination on lane 504, as robot 530 would then block lane 504 reserved for robot 510 as robot 510 proceeds toward its destination on lane 506. In particular, the multi-agent planner reserves conflict region 542 for the exclusive use of robot 530, instructs robot 530 to through conflict region 542 onto lane 506, releases the reservation of conflict region 542, and reserves conflict region 542 for the exclusive use of robot 510. Thus, the multi-agent planner can release the reservation of a conflict region, such as conflict region 542, for a higher-priority robot, such as robot 510, to enable lower-priority robots such as robots 520 and 530 to leave a lane, such as lane 504, to avoid blocking the lane for the higher-priority robot.

Figure 5D:
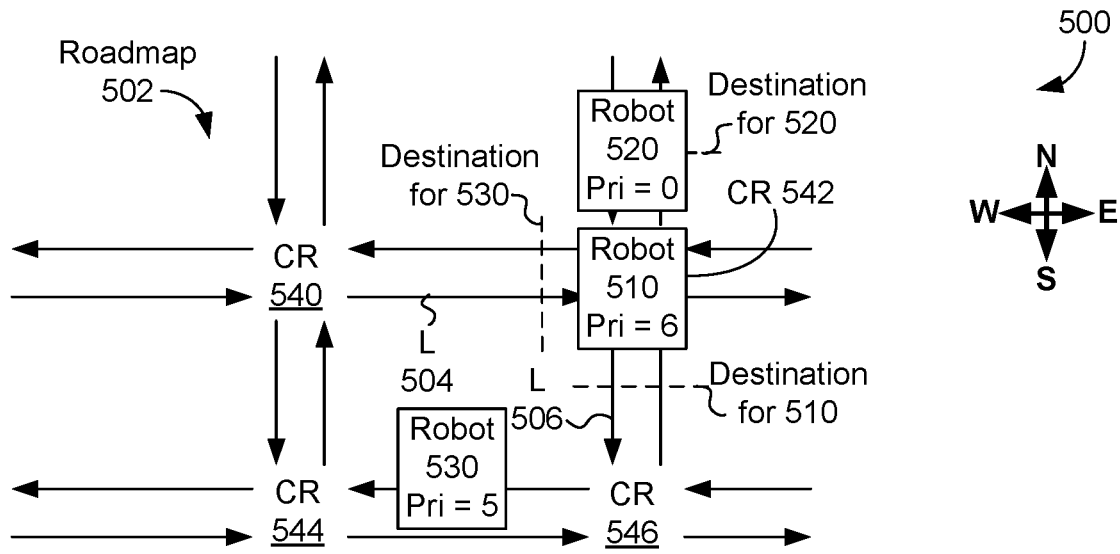
Figure 5E:
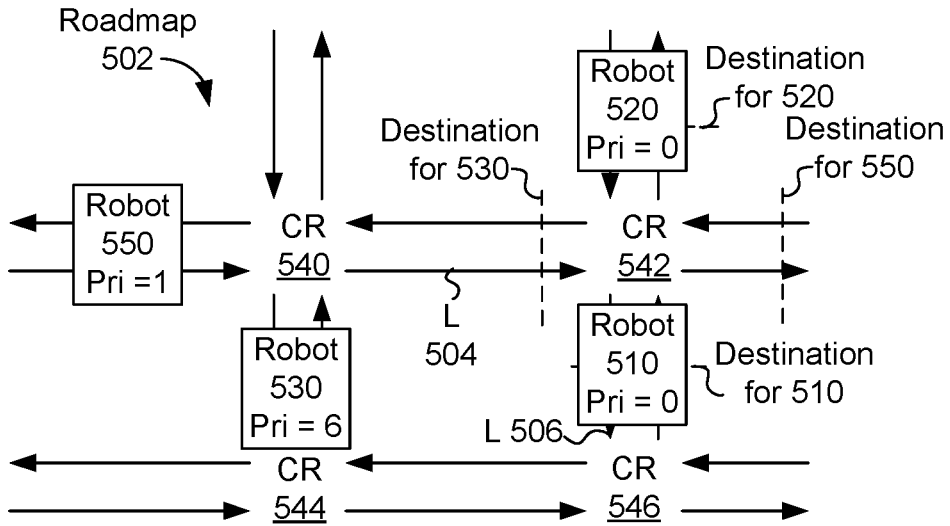
Figure 5F:
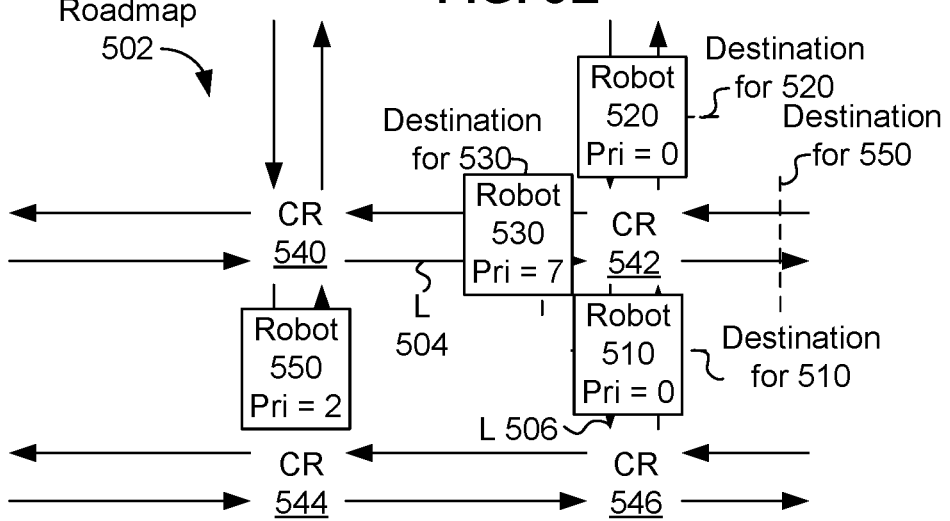

In this scenario, a route includes a sequence of lanes and wait times on lanes between a starting and ending destination. The multi-agent planner has altered the route of robot 520 to avoid blocking lane 504 for robot 510 by changing a wait time (i.e., reducing the wait time) of robot 520 on lane 504 by allowing robot 520 to proceed through conflict region 542 before higher-priority robot 510. Also, the multi-agent planner has altered the route of robot 530 to avoid blocking lane 504 for robot 510 by adding a lane cycle and corresponding wait times to the route of robot 530, so that robot 530 can traverse lanes 504 and 506 to allow higher-priority robot 510 to reach its destination on lane 506. FIGS. 5D, 5E, and 5F show robot 530 proceeding around a lane cycle before reaching its destination on lane 504. Once robot 530 reaches its destination, scenario 500 can end.

Scenario 500 begins, as shown in FIG. 5A, with robot 510 heading eastward toward conflict region 540, and robots 520 and 530 heading eastward on lane 504 from conflict region 540 toward conflict region 542, where robot 520 is closer to conflict region 542 than robot 530. The destination for robot 510 is on lane 506 that is directed southward from conflict region 542, the destination for robot 520 is on lane 508 north of conflict region 542, and the destination for robot 530 is on lane 504 just west of conflict region 542.

During scenario 500, the multi-agent planner determines priorities for a robot based on an amount of time the robot has been traveling along its route. At the onset of scenario 500, the multi-agent planner has assigned a priority of three to robot 510, a priority of one to robot 520, and a priority of two to robot 530 based on the amount of time taken by each respective robot while traveling on their respective routes. As robot 510 has the highest priority of the three robots, the multi-agent planner reserves a route including conflict region 540, lane 504, conflict region 542, and lane 506 for use by robot 510. The multi-agent planner also instructs robot 530 to proceed past its destination on lane 504 and take a clockwise lane cycle through conflict regions 542, 546, 544, and 540 (in order) before reaching its destination on lane 504. The multi-agent planner also recognizes that both robots 520 and 530 have to proceed through conflict region 542 to allow robot 510 to proceed through conflict region 542 (as passing on lane 504 is not feasible), and so temporarily reserves conflict region 542 for robot 520. The multi-agent planner further recognizes that lane 508 is not utilized by any robot or other agent and so directs robot 520 to proceed through conflict region 542 onto lane 508 to reach its destination. Thus, even though robot 520 has the lowest priority of robots 510, 520, and 530, robot 520 is in a position ahead of robots 510 and 530 so that robot 520 can proceed through conflict region 542 (and onto lane 508) before either robot 510 or robot 530 can reach conflict region 542. Thus, low-priority robot 520 can "sneak through" lane 504 and conflict region 542 before higher-priority robots 510 and 530 to reach its destination.

FIG. 5B shows robot 520 making a left turn from lane 504 to lane 508 through conflict region 542, robot 530 proceeding eastward on lane 504 toward conflict region 542, and robot 510 proceeding straight ahead (eastward) through conflict region 540 toward lane 504.

FIG. 5C shows that robot 520 has reached its destination on lane 508 and has had its priority reset to 0. Robot 520 stays at its destination for the remaining duration of scenario 500. FIG. 5C also shows that robot 530 has made a right turn from lane 504 through conflict region 542 onto lane 506, and is headed southward on lane 506 toward conflict region 546. To allow robot 530 to proceed on its clockwise lane cycle, the multi-agent planner has reserved conflict regions 546, 544, and 540, and respective connecting lanes for use by robot 530. After robots 520 and 530 have cleared conflict region 542, the multi-agent planner also reserves conflict region 542 for robot 510.

Turning to FIG. 5D, scenario 500 continues with robot 530 proceeding to the end of lane 506, turning right through conflict region 546, and proceeding westward toward conflict region 544. Once robot 530 clears lane 506 and conflict region 546, the multi-agent planner clears any related reservations for robot 530 on lane 506 and conflict region 546, and ensures that robot 530 has a reservation on a westbound lane toward conflict region 544.

Also, robot 510 proceeds to make a right turn from lane 504 to lane 506 via conflict region 542. Once robot 510 clears lane 504, the multi-agent planner clears a reservation for robot 510 on lane 504 and ensures that robot 510 has a reservation of conflict region 542 and a reservation on lane 506 toward its destination.

FIG. 5E shows that robot 510 has reached its destination on lane 506 and has had its priority reset to 0. Robot 510 stays at its destination for the remaining duration of scenario 500. FIG. 5C also shows that robot 530 has made a right turn through conflict region 544 and is headed northward toward conflict region 540. After robot 530 has cleared conflict region 544, the multi-agent planner can clear the reservation of conflict region 544 for robot 530, can ensure that robot 530 has a reservation on a northbound lane from conflict region 544 to conflict region 540, and can reserve conflict region 540 for robot 530. At this stage of scenario 500, robot 550 enters into the environment represented by roadmap 502 and proceeds eastward toward conflict region 540. As robot 550 has a priority of one, which is lower than robot 530's current priority of six, and since robot 530 is relatively near to conflict region 540 (which has been reserved for its use), the multi-agent planner instructs robot 550 to stop before reaching conflict region 540. That is, robot 550 is not allowed to sneak through conflict region 540 by the multi-agent planner due to the relative positions of robots 530 and 550 with respect to conflict region 540.

FIG. 5F shows that robot 530 has made a right turn through conflict region 540 onto lane 504 and has proceeded to its destination. Before robot 530 begins its right turn through conflict region 540, the multi-agent planner ensures that robot 530 has a reservation on lane 504, enabling robot 530 to proceed to its destination. Then, once robot 530 completes its right turn through conflict region 540, the multi-agent planner clears the reservation of conflict region 540 for robot 530, and reserves conflict region 540 for robot 550. Robot 550 is then directed to make a left turn through conflict region 540 and proceed southward toward conflict region 544, as shown in FIG. 5F. Once robot 530 reaches its destination, scenario 500 can be completed.

Figures 6A, 6B:
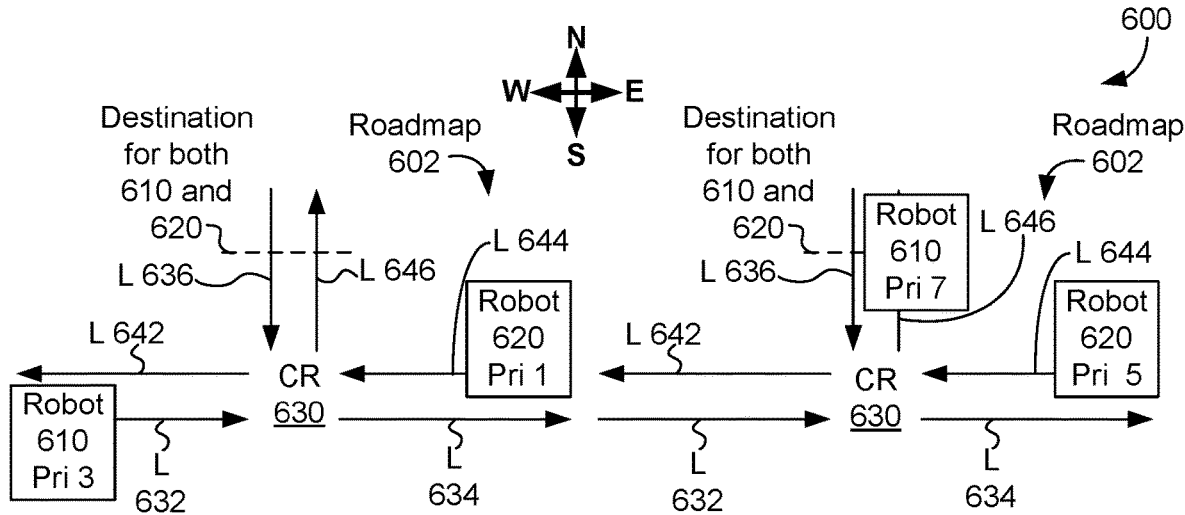
FIGS. 6A-6F show a scenario involving two robots passing through an intersection, in accordance with an example embodiment.

FIGS. 6A-6F show scenario 600 involving two robots 610, 620 passing through an intersection represented as conflict region 630, in accordance with an example embodiment. During scenario 600, the multi-agent planner determines priorities for a robot based on an amount of time the robot has been traveling along its route. FIG. 6A shows that at the onset of scenario 600, in an environment represented by roadmap 602, a multi-agent planner assigns a higher priority of three to robot 610 than a priority of one assigned to robot 620.

Roadmap 602 includes lane 632 directed eastward toward conflict region 630, lane 642 directed westward away from conflict region 630, lane 634 directed eastward away from conflict region 630, lane 644 directed westward toward conflict region 630, lane 636 directed southward toward conflict region 630, and lane 646 directed northward away from conflict region 630.

As robot 610 has the highest priority of any agent in the environment, the multi-agent planner reserves lane 632, conflict region 630, and lane 646 for robot 610 to allow robot 610 to reach its destination on lane 646. The multi-agent planner also instructs robot 620 to stop at its position on lane 644. In scenario 600, both robots 610 and 620 have a common destination on lane 646.

Figures 6C, 6D:
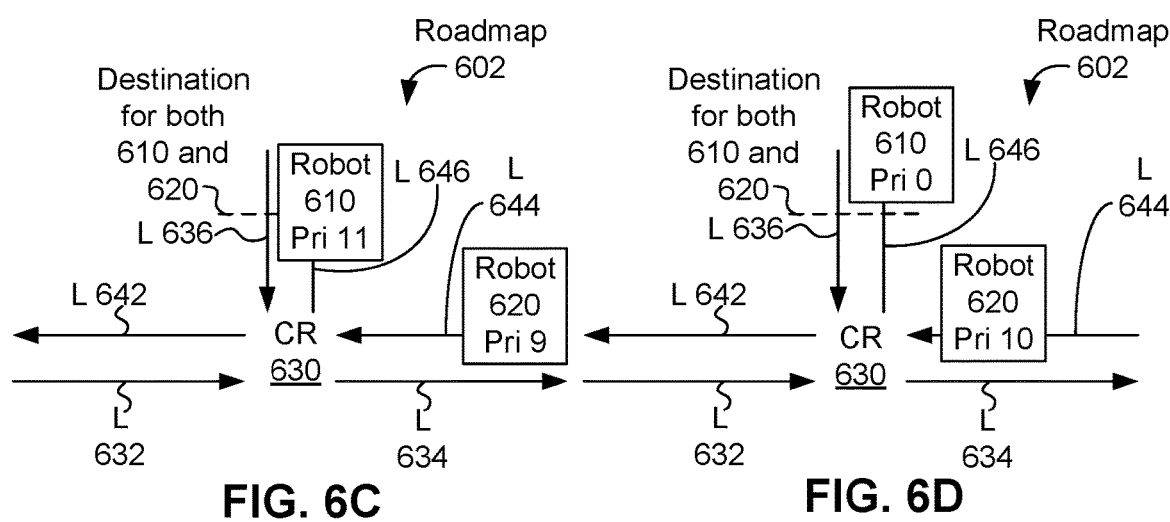

FIG. 6B shows that scenario 600 continues with robot 610 proceeding to the common destination on lane 646. At this time, robot 620 remains waiting on lane 644, as conflict region 630 is still reserved for robot 610. Scenario 600 proceeds with the multi-agent planner reserving conflict region 630 for robot 620 after robot 610 has been at the common destination for four time units. In scenario 600, the multi-agent planner waits four time units after robot 610 has been at the common destination as the multi-agent planner estimates that robot 610 will take at least four units to complete a task at the common destination. As both robots 610 and 620 have a common destination on lane 646, the multi-agent planner allots some time (e.g., four time units) for robot 610 to complete a task (or tasks) robot 610 may have at the common destination, as robot 610 will block robot 620 from reaching robot 620's destination until robot 610 leaves the common destination. In other scenarios, the multi-agent planner can change a reservation of a conflict region after more or fewer time units after a robot (or other agent) reaches its destination. FIG. 6C shows the environment represented by roadmap 602 after the multi-agent planner has waited for four time units after robot 610 has been at its destination before reserving conflict region 630 for robot 620.

FIG. 6D shows that scenario 600 proceeds after the multi-agent planner has instructed robot 620 to proceed along lane 644 toward critical region 630, as robot 610 has completed its task at the common destination on lane 646 and robot 610 has begun to move northward on lane 646. The multi-agent planner has also reset the priority of robot 610 to zero (i.e., the lowest-possible priority) upon completion of robot 610's task at the common destination.

Figures 6E, 6F:
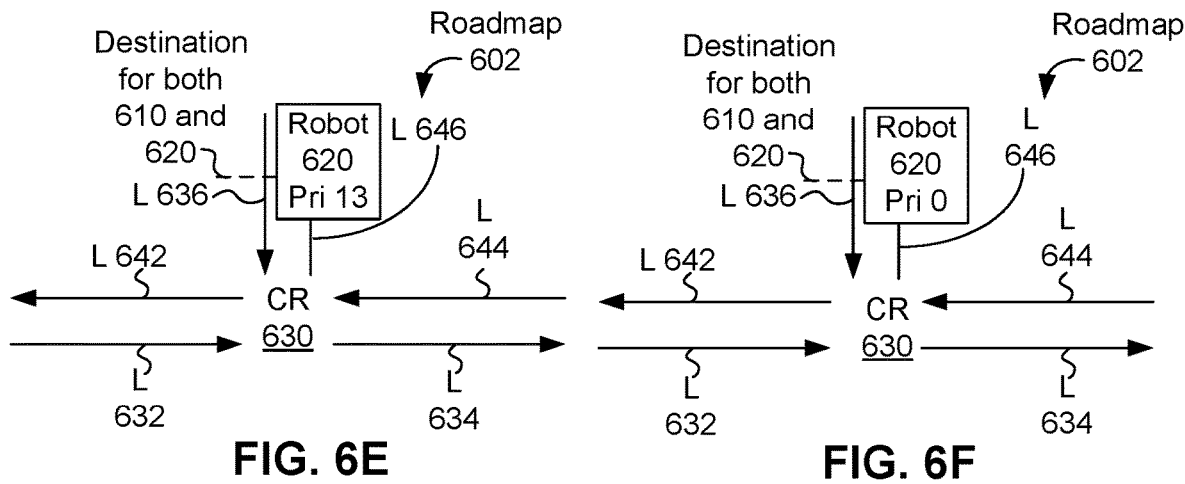

As illustrated by FIG. 6E, scenario 600 proceeds with robot 620 reaching the common destination on lane 646. Upon reaching the common destination, robot 620 begins to perform one or more tasks, such as pick and place operation(s), at the common destination.

As illustrated by FIG. 6F, scenario 600 proceeds with robot 620 performing the task(s) at the common destination on lane 646. The multi-agent planner resets the priority of robot 620 to zero upon completion of robot 620's task(s) at the common destination. After the multi-agent planner resets the priority of robot 620 to zero, scenario 600 can end.

A roadmap can include lanes, as indicated above. In some cases, a roadmap may not include any lanes. Then, the roadmap can be "annotated" or marked so to include lanes. That is, an existing roadmap can be annotated so that some or all edges of the roadmap can be marked as lanes. To annotate a portion of a roadmap as a lane, the annotated portion/the lane may meet one or more lane-oriented requirements. Example lane-oriented requirements include, but are not limited to:

- a requirement that a lane is a unidirectional edge of a graph that is separated enough from other lanes such that an agent on the lane does not conflict with any other agent on any other lane; for example, if a robot R_HIT1 on potential-lane L_HIT1 can possibly collide with a robot R_HIT2 on 1 potential-lane L_HIT2; i.e., if a geometry of potential-lanes L_HIT1 and L_HIT2 is such that L_HIT1 and L_HIT2 are too close together to avoid possible collisions, then robot R_HIT1 is in conflict with robot R_HIT2, and so potential-lanes L_HIT1 and L_HIT2 do not meet this lane-oriented requirement,
- a requirement that a lane ends sufficiently distant from a conflict region to avoid blocking the conflict region; that is, the lane ends far enough from intersections to allow intersection traversal,
- a requirement that the lanes in a roadmap form at least one cycle of lanes; a related lane-oriented requirement is that every lane in the roadmap is part of a cycle of lanes, and
- a requirement that a total length of all lanes in a roadmap can be large enough to fit all agents in an environment represented by the roadmap plus additional space for at least one other agent; a related lane-oriented requirement is that the total length of all lanes in a roadmap can be large enough to fit all agents in an environment represented by the roadmap plus additional space for at least one other agent and plus more additional space for "bubbles" or spaces between agents to avoid collisions.

Other lane-oriented requirements are possible as well.

In some embodiments, a user interface and/or other software executing on a computing device can enable annotation of a roadmap with lanes. In particular, the user interface and/or other software can enforce some or all of the above-mentioned lane-oriented requirements when annotating a roadmap.

For some roadmaps and collections of agents, lane annotation can be flexible. At one extreme, only very few edges in a roadmap may be marked as lanes to meet the total length requirement mentioned above. However, having few lanes can lead to agents reserving relatively large conflict areas. In some examples, a lane can be accompanied by non-lanes that overlapping the lane and perhaps travel in an opposite direction from the lane. The non-lanes can allow an agent to take a shorter non-lane route to a destination agent as long as the agent reserves an entire conflict region to another lane. For example, if lanes form a counterclockwise loop on a roadmap, an agent can go clockwise for part of the loop using non-lanes if the agent can reserve a region large enough to get back to safety of a lane. That is, an agent can make incremental progress along a lane, but for non-lane/conflict region traversal, the agent can either be routed to traverse the entire non-lane/conflict region, or the agent be routed to avoid the entire non-lane/conflict region.

The roadmap can be annotated with one or more waiting lanes that allow agents to wait before returning to the rest of the environment at particular locations, such as for parking spots, deep lanes, etc. For example, in a warehouse, a loading dock can be a popular destination location. Having a waiting lane at the loading dock allows an agent to wait on the waiting lane while in the process of being reassigned after completing a task. Without a lane to wait on, the agent will have to reserve another edge and perhaps a conflict region between edges, which will likely lead to blocking at least part of the loading dock from other agents. A waiting lane can have any length as long as the waiting lane can accommodate at least one agent. In some examples, the waiting lane can be connected to the rest of the roadmap via one or more non-lane edges.

FIGS. 7A-7D show scenario 700 where a user interface of a computing device, shown in the figures as roadmap editor 710, is used to annotate roadmap 720 with lanes, in accordance with an example embodiment. During scenario 700, the user interface is used to progressively annotate an existing roadmap with lanes and to provide information about lane-oriented requirements of the annotated roadmap.

Figure 7A:
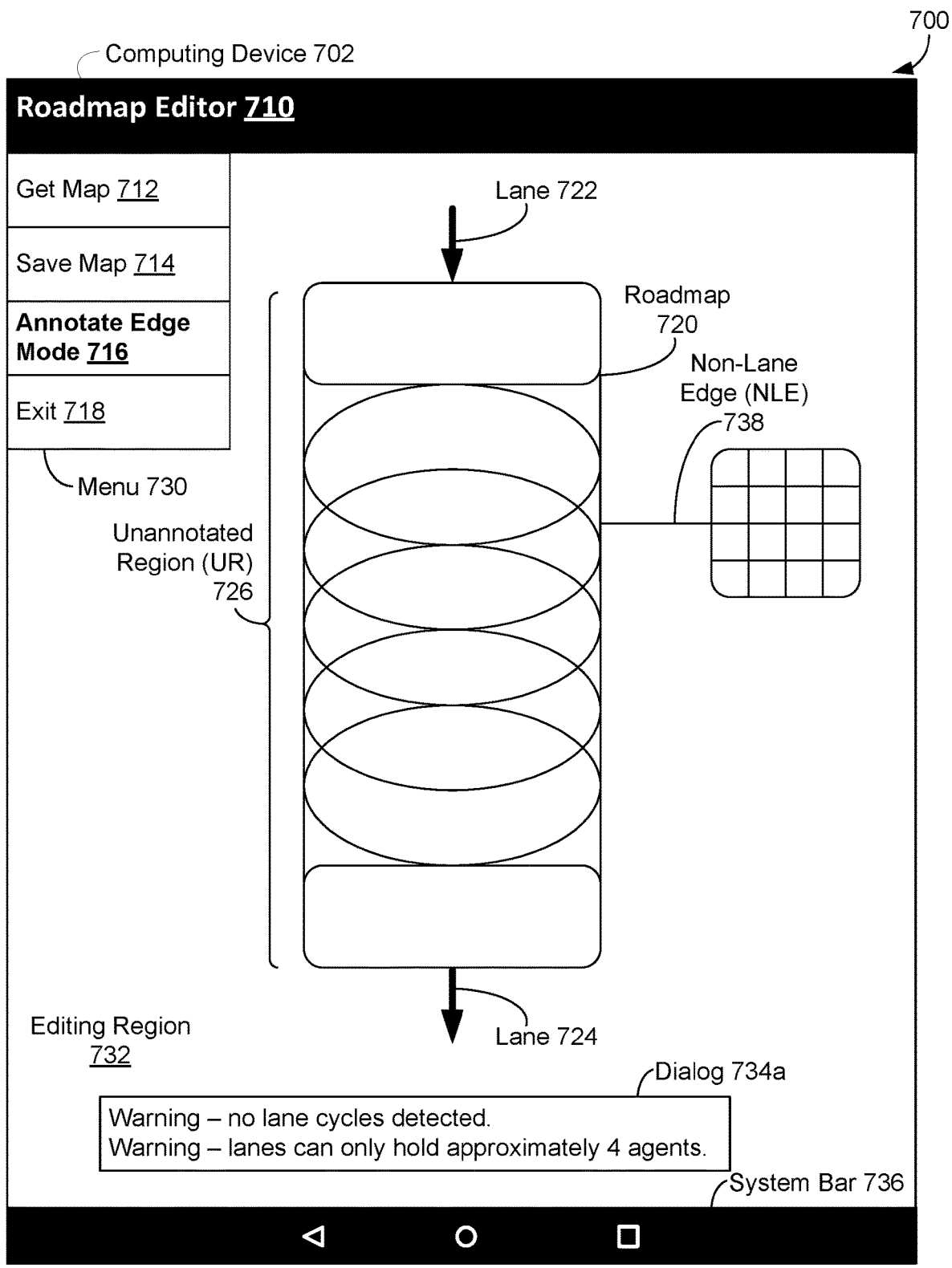
FIGS. 7A-7D show a scenario where a user interface of a computing device is used to annotate a roadmap with lanes, in accordance with an example embodiment.

FIG. 7A illustrates the user interface of scenario 700 that is provided by computing device 702 as roadmap editor 710. Roadmap editor 710 includes menu 730, editing region 732, a dialog labeled as 734a in FIG. 7A, and system bar 736. Menu 730 lists a number of selections related to a roadmap, such as roadmap 720 shown displayed in editing region 732, where a selection of menu 730, when chosen, can cause roadmap editor 710 to perform one or more operations related to the chosen selection.

FIG. 7A shows that menu 730 includes get map selection 712, save map selection 714, annotate edge mode selection 716, and exit selection 718. In other embodiments than those shown in FIGS. 7A, 7B, 7C, and 7D, menu 730 can provide more, fewer, and/or different menu selections. In still other embodiments, other graphical elements, such as pull-down menus, icons, and/or dialogs can be used with and/or replace one or more selections of menu 730.

Get map selection 712 can be used to retrieve a roadmap from data storage and load the retrieved roadmap into roadmap editor 710. Save map selection 714 can be used to store a roadmap currently loaded into roadmap editor 710 to data storage. For example, a roadmap can be stored in non-volatile data storage as one or more files, where non-volatile data storage is discussed below in the context of data storage 1404 of FIG. 14A.

Annotate edge mode 716 can be enabled if editing region 732 is being used to annotate edges as lanes or disabled if editing region 732 is not being used to annotate edges as lanes. In FIG. 7A, a menu item for annotate edge mode 716 is shown in bold to indicate that annotate edge mode 716 is enabled; e.g., edges of a roadmap displayed in editing region 732 can be annotated as lanes. For example, an edge E of roadmap can be selected via roadmap editor 710 and, if annotate edge mode 716 is enabled, part or all of edge E can be annotated as a lane. Exit selection 718 can be used to terminate execution of roadmap editor 710; e.g., exit an application for roadmap editor 710. In other scenarios, annotate edge mode 716 can be disabled—in these scenarios, annotate edge mode 716 can be displayed with a normal (i.e., non-bold) font. In still other scenarios, other graphical techniques, such as color, font size, and/or other font qualities than boldface, can be used to differentiate between an enabled annotate font mode and a disabled annotate font mode.

Editing region 732 can be used to create, review, and update roadmaps. For example, roadmaps can be updated by annotating lanes and/or creating, reviewing, updating, and/or deleting edges, lanes, and/or intersections of a roadmap displayed in editing region 624. After creating, reviewing, and/or updating a roadmap, the roadmap can be saved to data storage for later use; e.g., by selecting save map selection 714. In scenario 700, save map selection 714 was recently selected and so roadmap 720 has recently been saved to data storage. In other scenarios, other graphical techniques, such as color, font size, and/or other font qualities than boldface, can be used to differentiate between a recently-saved roadmap and a non-recently-saved roadmap.

Dialog 734a can provide information about a roadmap being edited, such as, but not limited to, information about lane-oriented requirements of an annotated roadmap. For example, roadmap 720 as displayed in FIG. 7A includes a bidirectional non-lane edge (NLE) 738 and has been annotated with two lanes—lane 722 at the top of roadmap 720 and lane 724 at the bottom of roadmap 720. In response to these annotations, roadmap editor 710 can determine whether roadmap 720 meets one or more lane-oriented requirements, such as discussed above and/or other information about the lane-oriented requirements, and provide that information via a dialog such as dialog 734a or via other user-interface techniques; e.g., a popup, a separate information pane or screen, etc. For example, when trying to add a lane to roadmap 720, roadmap editor 710 can check that the new lane meets the above-mentioned lane-oriented requirements; e.g., whether the new lane is unidirectional and ends sufficiently distant from a conflict region to avoid blocking the conflict region. In the specific example shown in FIG. 7A, dialog 734a indicates that "no lane cycles [are] detected"; that is, lanes 722 and 724 do not form a cycle; and that lanes 722 and 724 "can only hold approximately 4 agents." In scenario 700, approximately 12 agents are expected to operate in the environment represented by roadmap 720, and so lanes only holding four agents can be considered to violate a lane-oriented requirement that the lanes of roadmap 720 are to have sufficient space for at least 12 (expected) agents/robots.

In some examples, roadmap editor 710 can determine one or more locations on roadmap 720 suitable for new lanes, and then attempt to annotate the location(s) on the roadmap with the new lane(s) using the computing device. For example, roadmap editor 710 can find a location that appears be a hallway or other area wide enough for at least one robot to travel, and then attempt to annotate that location with one or more new lanes. Other techniques for finding locations for (potential) new lanes are possible as well.

System bar 736 shows a triangle, circle, and square, which can be used to return to a previous application executed prior to roadmap editor 710 by selecting the triangle, return to a home screen by selecting the circle, and provide a listing of all executed applications by selecting the square. Graphical elements, such as a selection of menu 732, lanes, edges, intersections, and dialogs shown in editing region 732, and the triangle, circle, and square of system bar 736, can be selected using a user input device of computing device 702. Example user input devices are described below in the context of user interface module 1401 shown in FIG. 14A.

Annotation of roadmap 720 with lanes 722 and 724 divides roadmap 720 into three regions: an annotated region that includes lane 722, another annotated region that includes lane 724, and unannotated region (UR) 726 between lane 722 and lane 724. If a multi-agent planner were to use roadmap 720 as shown in FIG. 7A to direct robots, the multi-agent planner can consider all of unannotated region 726 as one (large) conflict region. Then, to route robot R_UN through unannotated region 726, the multi-agent planner can reserve all of unannotated region 726 for the exclusive use of robot R_UN.

Figure 7B:
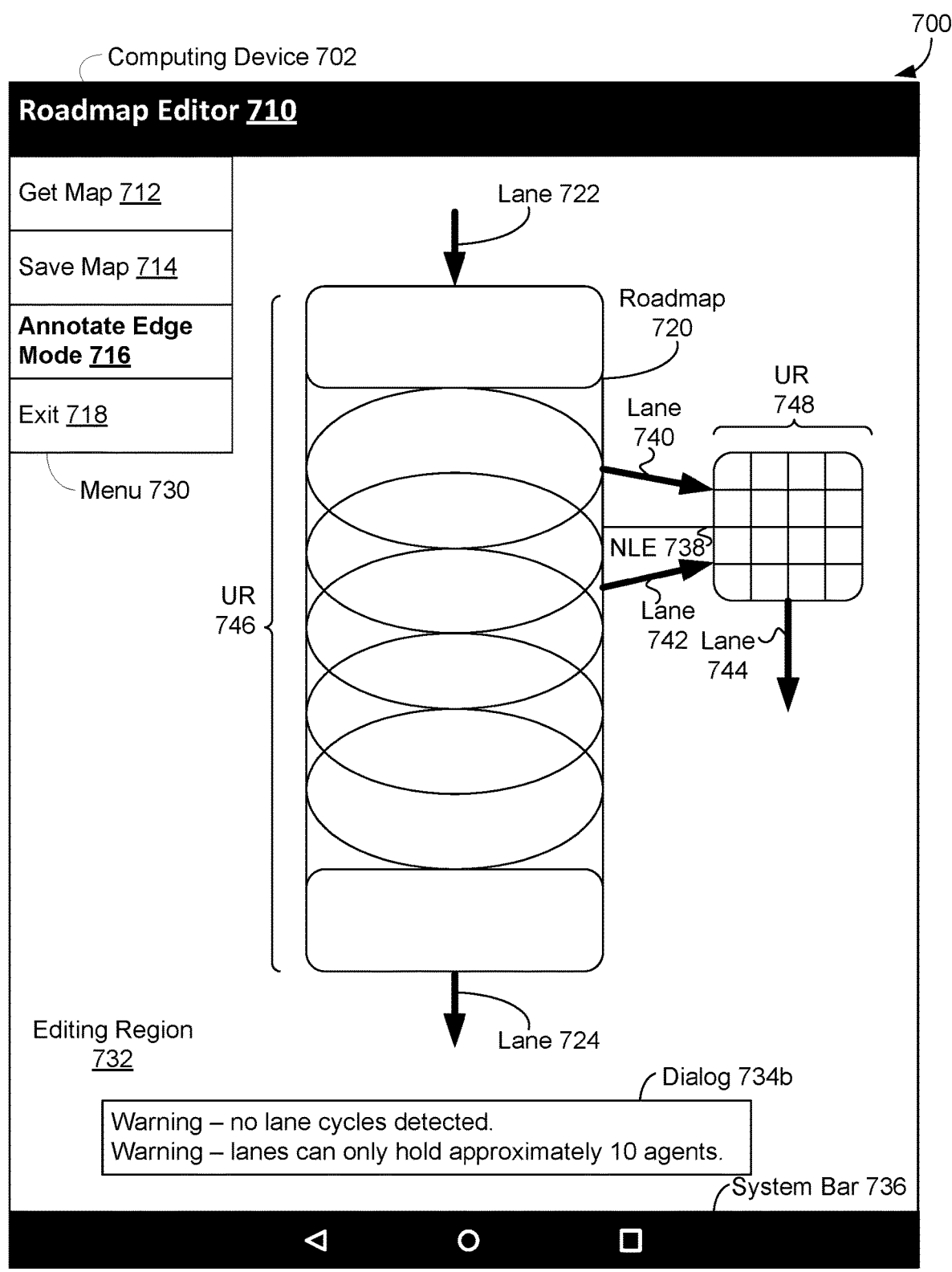

Scenario 700 continues roadmap 720 being annotated with additional lanes and then roadmap 720 being saved. FIG. 7B shows that roadmap 720, which previously was annotated only with lanes 722 and 724, has been annotated with lanes 740, 742, and 744.

In response to these annotations, roadmap editor 710 can determine whether roadmap 720 meets one or more lane-oriented requirements, such as discussed above and/or other information about the lane-oriented requirements, and provide that information via a dialog such as dialog 734b or via other user-interface techniques as mentioned in the context of FIG. 7A. In the specific example shown in FIG. 7B, dialog 734b indicates that "no lane cycles [are] detected"; that is, lanes 722, 724, 740, 742, and 744 do not form a cycle; and that lanes 722, 724, 740, 742, and 744 collectively "can only hold approximately 10 agents." In scenario 700, approximately 12 agents are expected to operate in the environment represented by roadmap 720, and so lanes only holding four agents can be considered to violate a lane-oriented requirement that the lanes of roadmap 720 are to have sufficient space for at least 12 (expected) agents/robots.

Annotation of roadmap 720 with lanes 740, 742, and 744 can be considered to divide roadmap 720 into six regions: (1) an annotated region for lane 722, (2) an annotated region for lane 724, (3) an annotated region for lane 744, (4) a partially annotated region that includes lane 740, lane 742, and non-lane edge 738, (5) unannotated region 746 between lane 722 and lane 724, and (6) unannotated region 748 to the right of lanes 740 and 742. If a multi-agent planner were to use roadmap 720 as shown in FIG. 7B to direct robots, the multi-agent planner can consider all of unannotated region 746 as one (large) conflict region and all of unannotated region 748 as another (large) conflict region separated from unannotated region by the partially annotated region that includes lanes 740 and 742. In some examples, the multi-agent planner can route robots through the partially annotated region by using lanes 740 and 742 to go from unannotated region 746 to unannotated region 748, and use non-lane edge 738 in a unidirectional fashion for routing from unannotated region 748 to unannotated region 746 (even though non-lane edge 738 is a bidirectional edge).

Figure 7C:
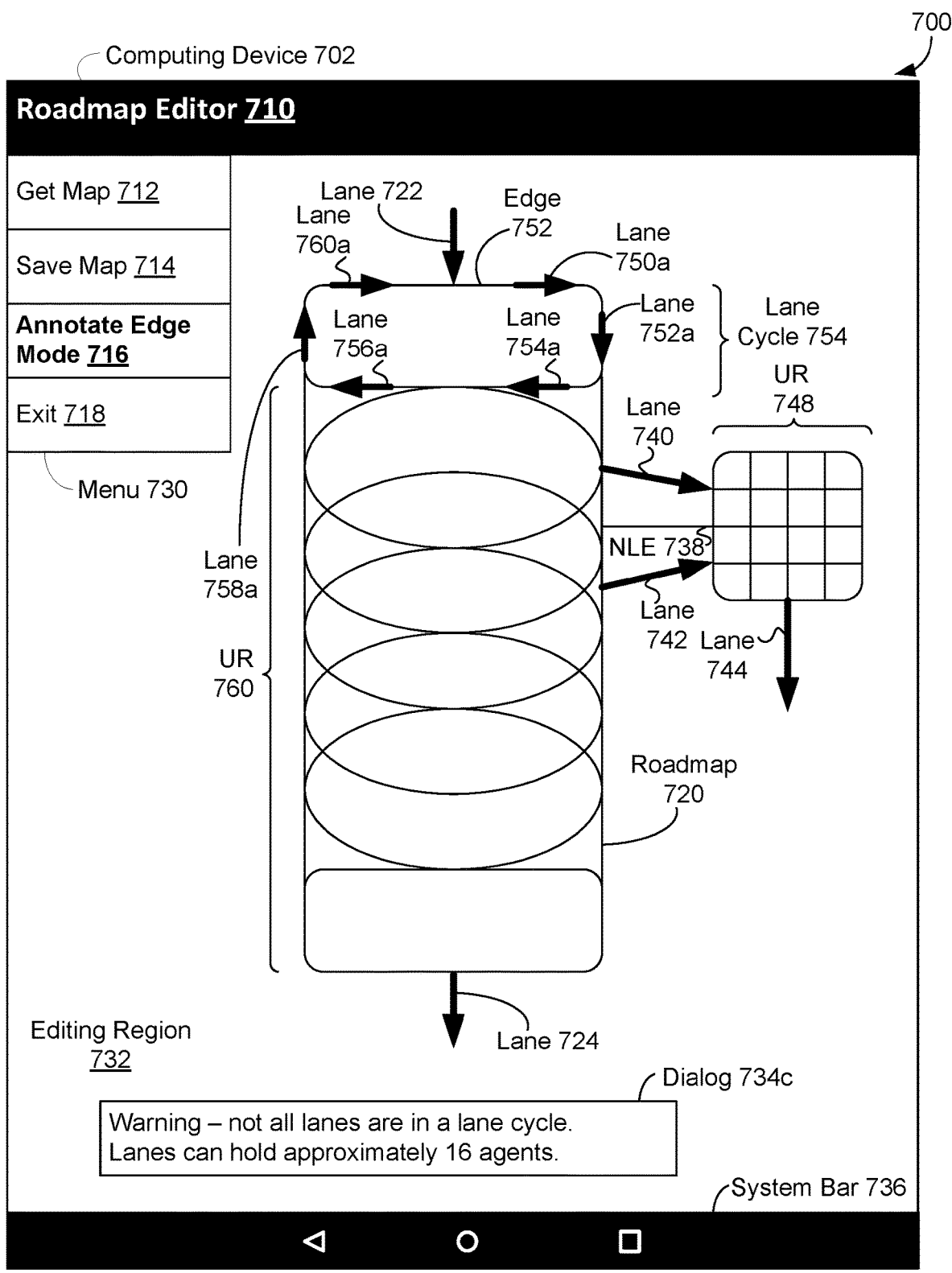

Scenario 700 continues roadmap 720 being annotated with additional lanes and then roadmap 720 being saved. FIG. 7C shows that roadmap 720, which previously was annotated with lanes 722, 724, 740, 742, and 744, now annotated with additional lanes 750*a*, 752*a*, 754*a*, 756*a*, 758*a*, and 760*a*. Lanes 750*a*, 752*a*, 754*a*, 756*a*, 758*a*, and 760*a*, along with intervening non-lane regions that can be treated as conflict regions, can form lane cycle 754. Also, the addition of lanes 750*a*, 752*a*, 754*a*, 756*a*, 758*a*, and 760*a* reduces the size of unannotated region 746 (shown in FIG. 7B) to smaller unannotated region 760, which lies between edges 754*a*, 756*a*, 740, 742, and 724. Further, in comparison to dialogs 734*a* and 734*b*, dialog 734*c* no longer includes a warning that no lane cycles are detected or a warning that fewer than 12 agents can be held by the lanes of roadmap 720; rather, dialog 734*c* states that the lanes of roadmap 720 "can" now "hold approximately 16 agents". In scenario 700, a lane-oriented requirement of an annotated roadmap is that each edge is part of a lane cycle, and so dialog 734*c* states a "Warning" that "not all lanes are in a lane cycle"; e.g., at least lanes 740, 742, and 744 are not part of a lane cycle.

If a multi-agent planner were to use roadmap 720 as shown in FIG. 7C to direct robots, the multi-agent planner can consider all of unannotated region 760 as one (large) conflict region and all of unannotated region 748 as another (large) conflict region separated from unannotated region by the partially annotated region that includes lanes 740 and 742. The multi-agent planner can also route robots/agents around lane cycle 754, including blocking and unblocking intervening conflict regions/non-lane edges, to allow robots/agents to proceed without deadlocks in an upper portion of roadmap 720 that includes lane cycle 754.

Figure 7D:
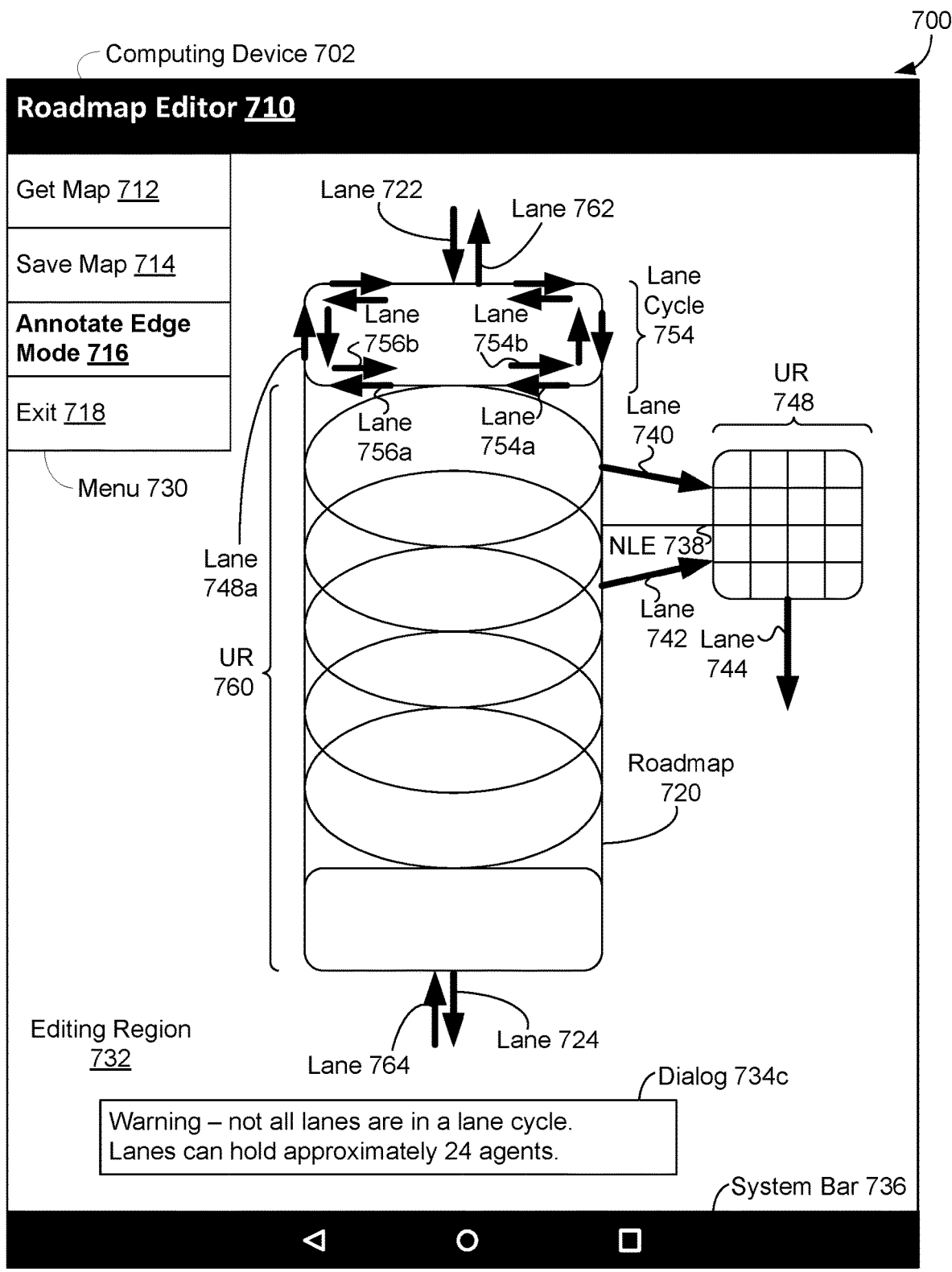

Scenario 700 continues roadmap 720 being annotated with additional lanes and then roadmap 720 being saved. FIG. 7D shows that roadmap 720 has been annotated with additional lanes so that lane cycle 754 can be considered either as one bi-directional lane cycle or as a pair of lane cycles, with a first cycle of lanes that includes lanes 754*a* and 756*a* and intervening non-lane regions (that can be considered as conflict regions as mentioned above) allowing travel in a clockwise direction, and a second cycle of lanes that includes lanes 754*b* and 756*b* and intervening non-lane regions (that can be considered as conflict regions as mentioned above) allowing travel in a counterclockwise direction. Dialog 734*d* states that the lanes of roadmap 720 "can" now "hold approximately 24 agents" and reissues the "Warning" that "not all lanes are in a lane cycle"; e.g., lanes 740, 742, and 744 are still not part of a lane cycle.

A multi-agent planner could use roadmap 720 as shown in FIG. 7D to direct robots in a similar fashion to roadmap 720 as shown in FIG. 7C. However, roadmap 720 as shown in FIG. 7D provides additional space for agents on lanes and additional flexibility to route robots in the upper portion of roadmap 720 that includes lane cycle 754. After roadmap 720 as shown in FIG. 7D has been saved, scenario 700 can be completed.

Other models of lanes, conflict regions, annotated regions, unannotated regions, partially annotated regions, edges, and roadmaps are possible as well. In some embodiments, a model, such as a kinematic model, of a robot can be used to determine one or more locations where the robotic device should stop rather than stopping before reaching an end of a lane.

When an agent starts an operation at the destination location, the multi-agent planner can estimate how long the agent will stay at a destination location to determine how long the area around the destination location remains blocked. While the destination location is blocked, the multi-agent planner can reroute other agents to avoid the blocked destination location, perhaps causing them to take longer routes. Then, once the destination location becomes available again, such as when the agent completes one or more operations that utilized the destination location, the multi-agent planner can release the block on the area around the destination location, so that the area around the destination location can become unblocked. When the destination location becomes unblocked, the multi-agent planner can reroute other agents to use the blocked destination location area, perhaps causing them to take shorter routes the destination location area.

Figure 8:
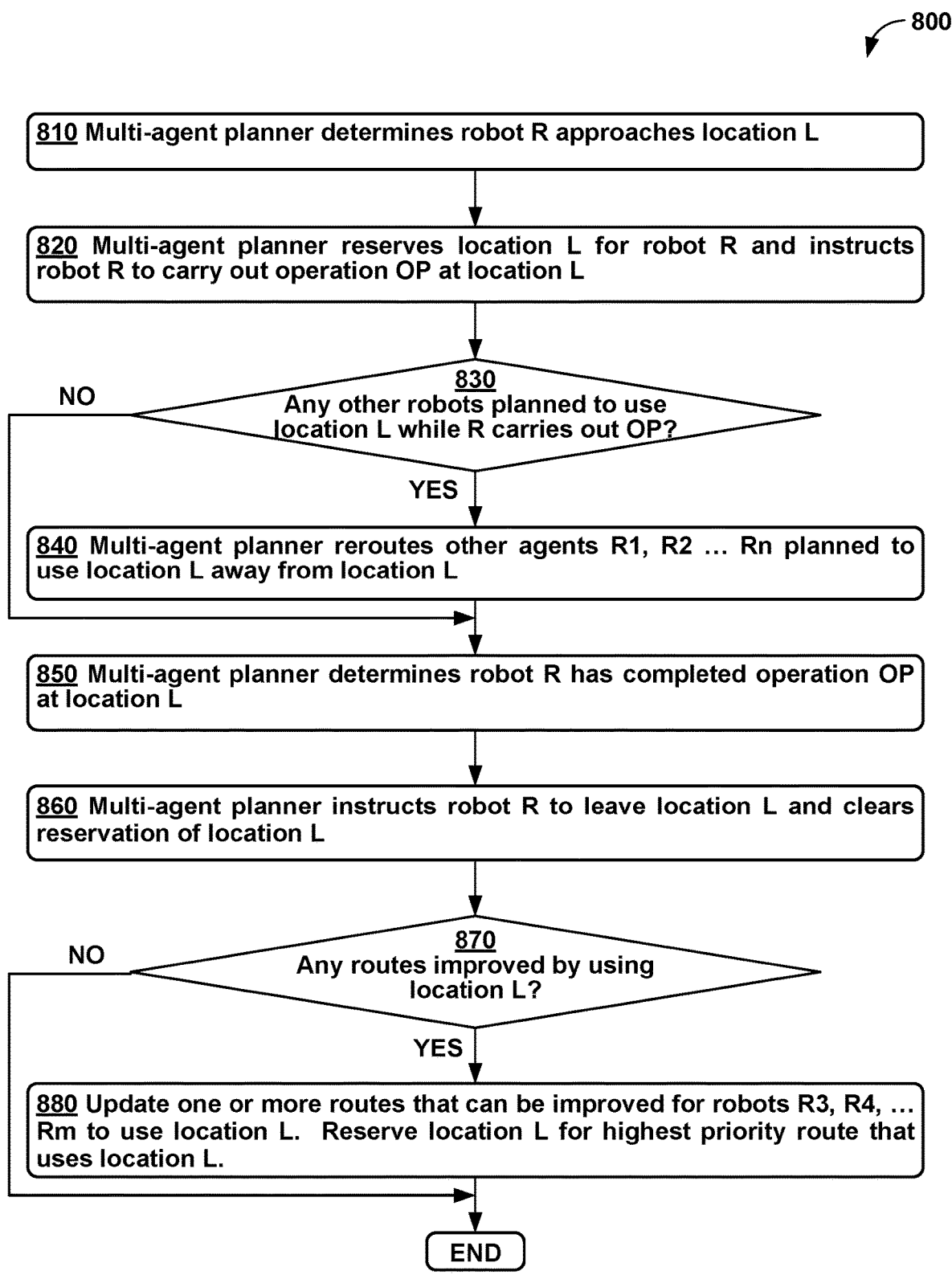
FIG. 8 is a flowchart of a method for blocking and unblocking of locations, in accordance with an example embodiment.

FIG. 8 is a flowchart of method 800 for blocking and unblocking of locations, in accordance with an example embodiment. Method 800 can be carried out by a computing device, such as computing device 1400 described below at least in the context of FIG. 14A. In particular, computing device 1400 can execute software embodying a herein-described multi-agent planner to carry out method 800. Method 800 is described in terms of operations involving robots, but the techniques of method 800 are applicable to agents in general.

At block 810, the multi-agent planner can determine that a robot R is approaching a location L of an environment with a plurality of agents that include robot R.

At block 820, the multi-agent planner can reserve location L for the use of robot R and can instruct robot R to use location L. For example, robot R can be a relatively-high priority agent. By reserving location L for robot R, the multi-agent planner can ensure that other lower-priority robot do not block or otherwise interfere with robot R while at location L.

At block 830, the multi-agent planner can determine whether any other robots are planning to use location L while robot R is at location L. The multi-agent planner can make this determination based on an estimate how long robot R will stay at location L, and based on that estimate, the multi-agent planner can determine an estimate of how long location L will be blocked. For example, if robot R is estimated to be at location L for 60 seconds, and it is estimated that robot R takes five seconds to stop at, restart, and leave from location L, then the multi-agent planner can estimate that location L will be blocked for (approximately) 65 seconds. Other techniques for estimating of how long a location can be blocked are possible as well.

If the multi-agent planner determines that one or more robots other than robot R are planning to use location L while robot R is at location L, the multi-agent planner can proceed to block 840. Otherwise, the multi-agent planner can determine that only robot R is planning to use location L while robot R is at location L, and can proceed to block 850

At block 840, the multi-agent planner can reroute robots R1, R2 . . . Rn which are the one or more robots other than robot R planning to use location L while robot R is at location L discussed in block 830, away from location L.

At block 850, the multi-agent planner can direct robot R to use location L. Upon arrival at location L, robot R can carry out an operation OP at location L. Examples of operation OP include, but are not limited to, one or more of: traversal of location L, waiting for a reservation for a conflict region and/or a lane while at location L, and a pick and place operation at location L. In some examples, more, fewer, and/or different operations can be involved as operation OP at location L. Then, the multi-agent planner can determine that robot R has completed operation OP at location L; e.g., robot R can inform the multi-agent planner that operation OP has been completed and/or the multi-agent planner can estimate an amount of time for robot R to complete operation OP at location L and the estimated amount of time can have expired.

At block 860, the multi-agent planner can, after determining that operation OP has been completed by robot R while at location L, instruct robot R to leave location L. Upon determining that robot R has left location L, the multi-agent planner can clear the reservation on location L for the use of robot R.

At block 870, after clearing the reservation of location L, the multi-agent planner can determine whether any routes of any robots can be improved by rerouting through location L. The multi-agent planner can make this determination based on determining an estimated time T_WITH_L for a route R_WITH_L using location L and comparing that estimated time T_WITHOUT_L to an estimated time for a corresponding route R_WITHOUT_L not using location L. If T_WITH_L is less than T_WITHOUT_L, then the multi-agent planner can determine that rerouting the robot to use route R_WITH_L would improve over the a corresponding route R_WITHOUT_L. Other techniques for determining whether routes of robots can be improved are possible as well; e.g., techniques that determine improvement based on other and/or additional criteria than time.

If the multi-agent planner determines that one or more robots other than robot R are planning to use location L while robot R is at location L, the multi-agent planner can proceed to block 880. Otherwise, the multi-agent planner can determine not to reroute any robots to use location L, and method 800 can be completed.

At block 880, the multi-agent planner can update one or more routes for corresponding robots R3, R4 . . . Rm to use location L, as these updated routes were determined to be improved at block 870. The multi-agent planner can determine a highest priority robot R_HIPRI of robots R3, R4 . . . Rm routed to use location L and reserve location L for the use of robot R_HIPRI. Upon completion of the procedures of block 880, method 800 can be completed.

Figure 9:
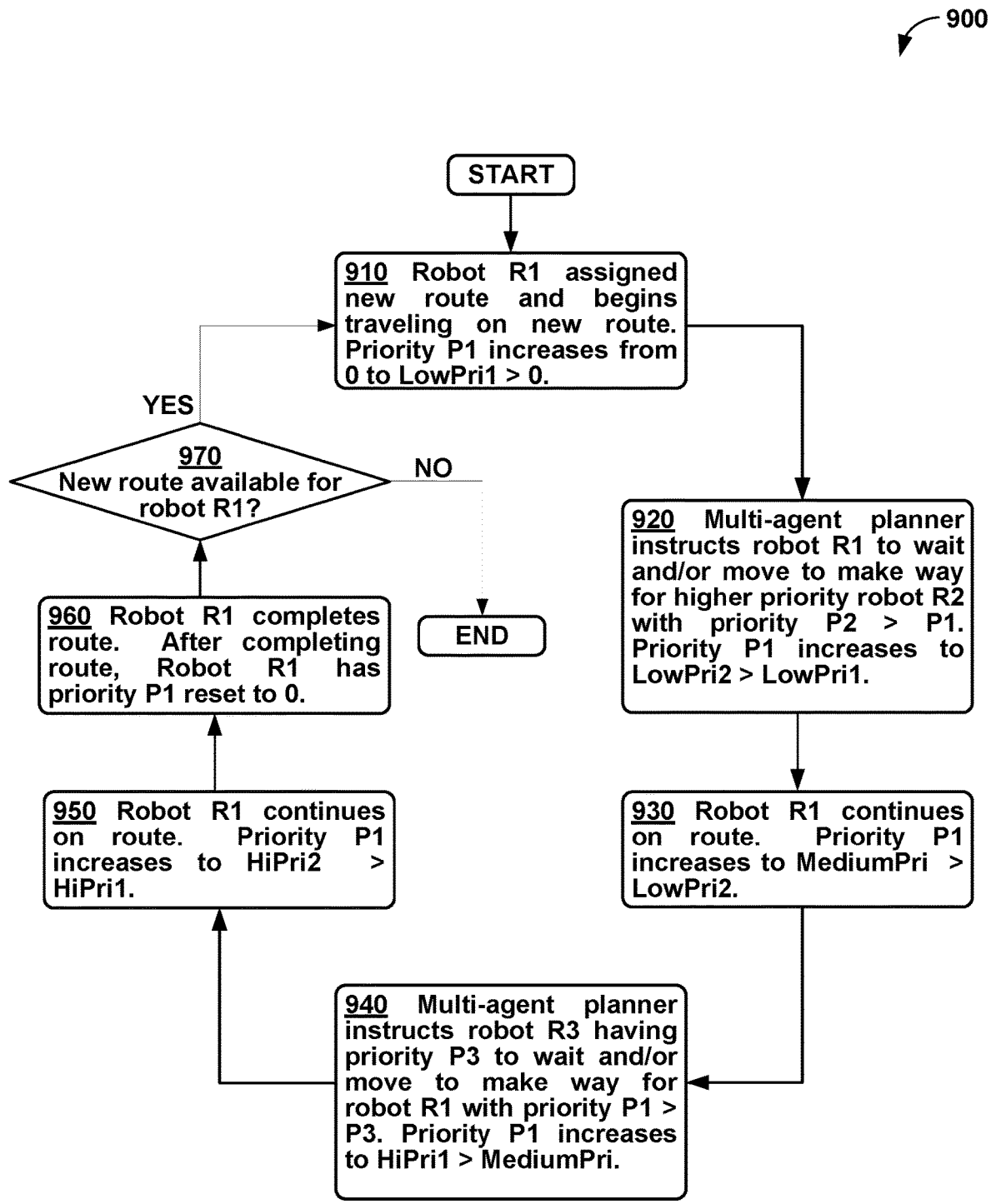
FIG. 9 depicts a priority cycle for an agent, in accordance with an example embodiment.

FIG. 9 depicts a priority cycle 900 for an agent in accordance with an example embodiment. Priority cycle 900 can be carried out by an agent, indicated as robot R1 in FIG. 9, and a multi-agent planner that instructs robot R1 are operating in an environment with a plurality of agents that include R1. Priority cycle 900 is described in terms of operations involving robots, but the techniques of priority cycle 900 are applicable to agents in general. In some examples, the multi-agent planner and some or all of the agents in the environment can be performing priority cycles such as priority cycle 900.

Priority cycle 900 can begin when the multi-agent planner instructs R1 to start with a new route. At this time, R1 is assigned a minimum priority; e.g., a priority value of 0, where priorities are indicated using non-negative numbers, and where a larger priority value indicates a higher priority, such as a priority value of 12 representing a higher priority value than 10, such as the priorities discussed above in the context of FIGS. 3-6F. A robot can be assigned the minimum priority either as an initial priority; e.g., when robot R1 is scheduled for its first route, or can be assigned as part of a priority reset that occurs when the agent completes its route.

As robot R1 proceeds along its route, robot R1's priority value can increase monotonically, such as R1's priority value being based on an amount of time the robot has spent on its route, as discussed above at least in the context of FIGS. 3 and 4B-6F. While en route, the robot R1 can be instructed by the multi-agent planner to get out of the way and/or wait out of the way of one or more higher-priority robots R2 . . . Rn to allow the higher-priority robot(s) to proceed along their routes, as discussed above at least in the context of FIGS. 3-6F. As robot R1 proceeds along its route, R1's priority increases so that R1 becomes a relatively-high priority robot and one or more lower-priority robots R3 . . . Rm can be instructed to get out of the way and/or wait out of the way of R1's route. Once R1 reaches its destination, R1's priority can be reset and an iteration of priority cycle 900 can be completed.

FIG. 9 shows that an iteration of priority cycle 900 can begin at block 910, where a multi-agent planner can assign robot R1 a new route. Robot R1 can be assigned a new route as an initial matter; e.g., when robot R1 first is put into service, or upon completion of a previous route. When R1 begins its route, its priority P1 can be set to a minimum priority value; e.g., 0 as shown in FIG. 9. As R1 travels along its route, P1 can increase; as R1 initially starts its route, P1 can increase to a priority value of LowPri1, which is greater than the minimum priority value of 0.

At block 920, the multi-agent planner can instruct R1, having priority P1=LowPri1, to wait and/or move out the way of higher-priority robot R2, whose priority P2 is greater than LowPri1. As robot R1 waits and/or moves out the way of robot R2, priority P1 increases to a value of LowPri2, which is greater than LowPri1.

At block 930, robot R1 continues on its route. Priority P1 increases as robot R1 is en route to a priority value of MediumPri, which is greater than LowPri2.

At block 940, the multi-agent planner can instruct R1, having priority P1=MediumPri, to proceed along its route while a lower-priority robot R3, whose priority P3 is less than MediumPri, waits and/or moves out the way of robot R1. As R1 proceeds along its route, priority P1 increases to a value of HiPri1, which is greater than MediumPri.

At block 950, robot R1 continues on its route. Priority P1 increases as robot R1 is en route to a priority value of HiPri2, which is greater than HiPri1. In some examples, robot R1 can be the highest-priority robot in an environment, and then, all other robots in the environment may be instructed by the multi-agent planner wait and/or move out the way of robot R1.

At block 960, robot R1 completes its route by reaching a destination location of the route. In some examples, robot R1 can perform part or all of one or more operations en route and/or at the destination location, such as one or more pick and place operations. In particular examples, a route of an agent, such as robot R1, can be considered to be completed when the agent reaches a destination location of the route. In other examples, the route of the agent can be considered to be completed when the agent completes all operations at the destination location; that is, the route is completed when the agent is ready for a new route. In still other examples, the route of the agent can be considered to be completed when the agent reaches the destination location and either is ready to leave the destination location or has been at the destination location for at least an amount of time. The amount of time can be a pre-determined amount of time (e.g., 5 seconds, 60 seconds, 3 minutes), based on an estimate of how long the agent requires to complete completes all operations at the destination location, and/or otherwise determined; e.g., an amount of time to wait until another route is available. Upon completion of the route, priority P1 for robot R1 can be reset to the minimum priority value.

At block 970, the multi-agent planner can determine whether a new route is available for robot R1. If a new route is available for R1, the multi-agent planner and R1 can proceed to block 910 and begin another iteration of priority cycle 900. If no new route is available for R1, the multi-agent planner can instruct R1 to perform one or more operations unrelated to proceeding on a route; e.g., shut down, perform diagnostics/maintenance, go to a waiting area, and thereby exit priority cycle 900. In other examples, the multi-agent planner and/or R1 can exit priority cycle 900 for other reasons than no new routes being available as indicated at block 970; e.g., R1 is scheduled for maintenance, the presence of obstacles in the environment reduces the number of agents directed by the multi-agent planner, materials are unavailable for pick and place operations, etc.

System Design for Robotic Devices

Figure 10:
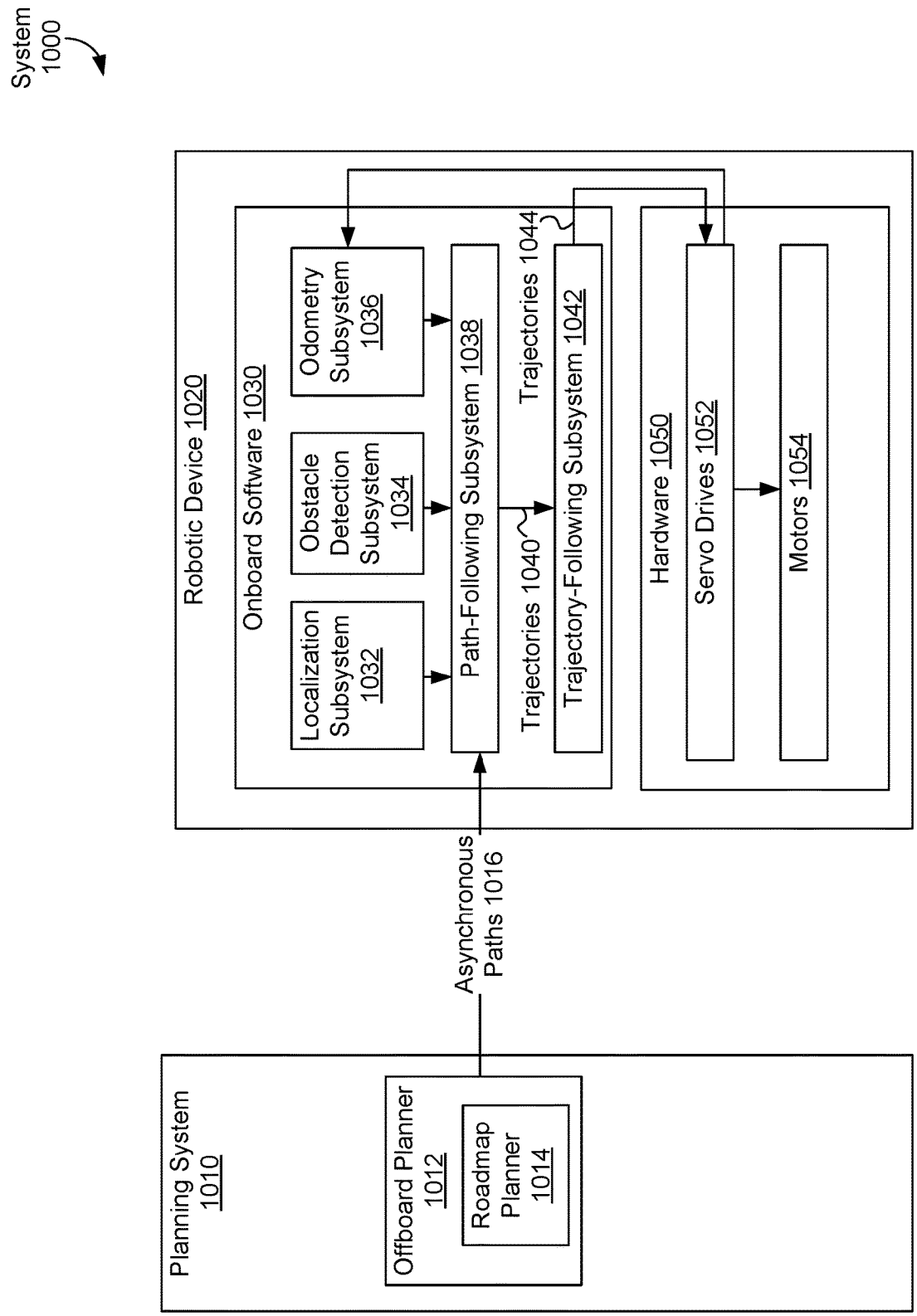
FIG. 10 is a block diagram of a system, in accordance with an example embodiment.

FIG. 10 is a block diagram of system 1000, in accordance with an example embodiment. System 1000 includes planning system 1010 and robotic device 1020. Planning system 1010 can include offboard planner 1012 that can coordinate motion of one or more robotic devices operating in an environment. Offboard planner 1012 can include roadmap planner 1014. Offboard planner 1012 and/or roadmap planner 1014 can generate one or more asynchronous paths 1016 for a robotic device, such as robotic device 1020, to follow while operating in an environment.

A roadmap graph, prototype graph, or other roadmap representing an environment, such as prototype graph 1200 discussed below in the context of FIG. 12, can be received, determined, or otherwise provided to planning system 1010, offboard planner 1012 and/or roadmap planner 1014. Asynchronous paths 1016 can be one or more paths based on the roadmap graph, prototype graph, or other roadmap. For example, if the roadmap graph, prototype graph, or other roadmap has a plurality of edges that connect a plurality of intersections, asynchronous paths 1016 can be specified in terms of the plurality of edges and/or the plurality of intersections.

In some examples, offboard planner 1012 and/or roadmap planner 1014 can include some or all of the herein-described functionality of a multi-agent planner. In these examples, a roadmap graph, prototype graph, or other roadmap can have a plurality of edges and/or a plurality of lanes that connect a plurality of intersections; e.g., offboard planner 1012 and/or roadmap planner 1014 can act as a multi-agent planner utilizing one or more of roadmaps 310, 402, 502, 602, and 720. In particular of these examples, one or more of asynchronous paths 1016 can include one or more lanes, non-lane edges, and/or hyperedges, where hyperedges are discussed above at least in the context of FIG. 1 above. In more particular of these examples, one or more of asynchronous paths 1016 can include a time-ordered sequence of hyperedges for one agent, where the hyperedges in the time-ordered sequence of hyperedges can be considered in order of their completion times. In other examples, one or more robotic devices 1020 can perform the herein-described functions of one or more of robots 110, 120, 130, 140, 214, 224, 234, 244, 330, 332, 414, 416, 424, 426, 434, 436, 444, 446, 470, 472, 474, 476, 510, 520, 530, 550, 610, 620; i.e., one or more of robots 110-620 can be embodied as robotic device 1020.

Robotic device(s) 1020 can include onboard software 1030 and/or hardware 1050. Onboard software 1030 can include one or more of: localization subsystem 1032, obstacle detection subsystem 1034, odometry subsystem 1036, path-following subsystem 1038, and trajectory-following subsystem 1042. Localization subsystem 1032 can be used to localize a robotic device, that is, determine a location of the robotic device within an environment. Localization subsystem 1032 can generate position estimates of the robotic device and/or other objects that can be used to localize the robotic device, assist the robotic device in following a path, such as asynchronous paths 1016, and/or assist the robotic device in following a trajectory, such as trajectories 1040. Once the position estimates are generated, localization subsystem 1032 can provide the position estimates to path-following subsystem 1038.

An asynchronous path, or path for short, can be a time-invariant plan or other information indicating how robotic device 1020 can travel from a starting point SP to an ending point EP; i.e., an (asynchronous) path does not take time into account. In contrast, a trajectory can include values of a steering angle and of traction motor velocity that robotic device 1020 can follow for a planning time interval.

The planning time interval can be a duration of time used that a robotic device is guided, or planned to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 1020 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 1020, and actuator positions of robotic device 1020.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 1034 can determine whether one or more obstacles are blocking a path and/or a trajectory of robotic device 1020. Examples of these obstacles can include, but are not limited to, pallets, objects that may have fallen off a pallet, robotic devices, and human operators working in the environment. If an obstacle is detected, obstacle detection subsystem 1034 can provide one or more communications indicating obstacle detection to path-following subsystem 1038. The one or more communications indicating obstacle detection can include location information about one or more positions of one or more obstacles detected by obstacle detection subsystem 1034 and/or identification information about the one or more obstacles detected by obstacle detection subsystem 1034. Odometry subsystem 1036 can use data, such as data from servo drives 1052, to estimate one or more changes in position of robotic device 1020 over time.

Path-following subsystem 1038 and/or trajectory-following subsystem 1042 can act as a planner aboard robotic device 1020. This onboard planner can follow one or more paths, such as asynchronous paths 1016, based on position estimates provided by localization subsystem 1032.

Path-following subsystem 1038 can receive asynchronous paths 1016, position estimate inputs from localization subsystem 1032, location information about one or more positions of one or more obstacles from obstacle detection subsystem 1034, and/or information about one or more changes in position from odometry subsystem 1036, and generate one or more trajectories 1040 as outputs.

Hardware 1050 can include servo drives 1052 and/or motors 1054. Servo drives 1052 can include one or more servo drives. Servo drives 1052 can include an electronic amplifier used to power one or more servomechanisms and/or can monitor feedback signals from the servomechanism(s). Servo drives 1052 can receive control signals, such as trajectories 1044, from onboard software 1030, and can provide electric current to the servomechanism(s) to produce motion proportional to the control signals. In some embodiments, servo drives 1052 can compare status information received from the servomechanism(s) with an expected status as commanded by trajectories 1044. Then, servo drives 1052 can adjust a voltage frequency or pulse width of the provided electric current to correct for deviations between received status information and an expected status. In other embodiments, servo drives 1052 can provide information, such as the feedback signals and/or location-related information, to onboard software 1030.

One or more motors 1054 can be part or all of the servomechanism(s) powered by servo drives 1052. For example, motors 1054 can use the electric current provided by servo drives 1052 to generate mechanical force to drive part or all of robotic device 1020; e.g., motors 1054 can provide force to propel robotic device 1020 and/or drive one or more effectors of robotic device 1020.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths and/or lanes that agents, such as robotic devices (robots), may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate. Such path planning can be carried out at least in part by a herein-described multi-agent planner.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment. In further examples, a prototype graph can be a roadmap that has been annotated with one more lanes, such as discussed above in the context of FIGS. 7A-7D.

Figure 11:
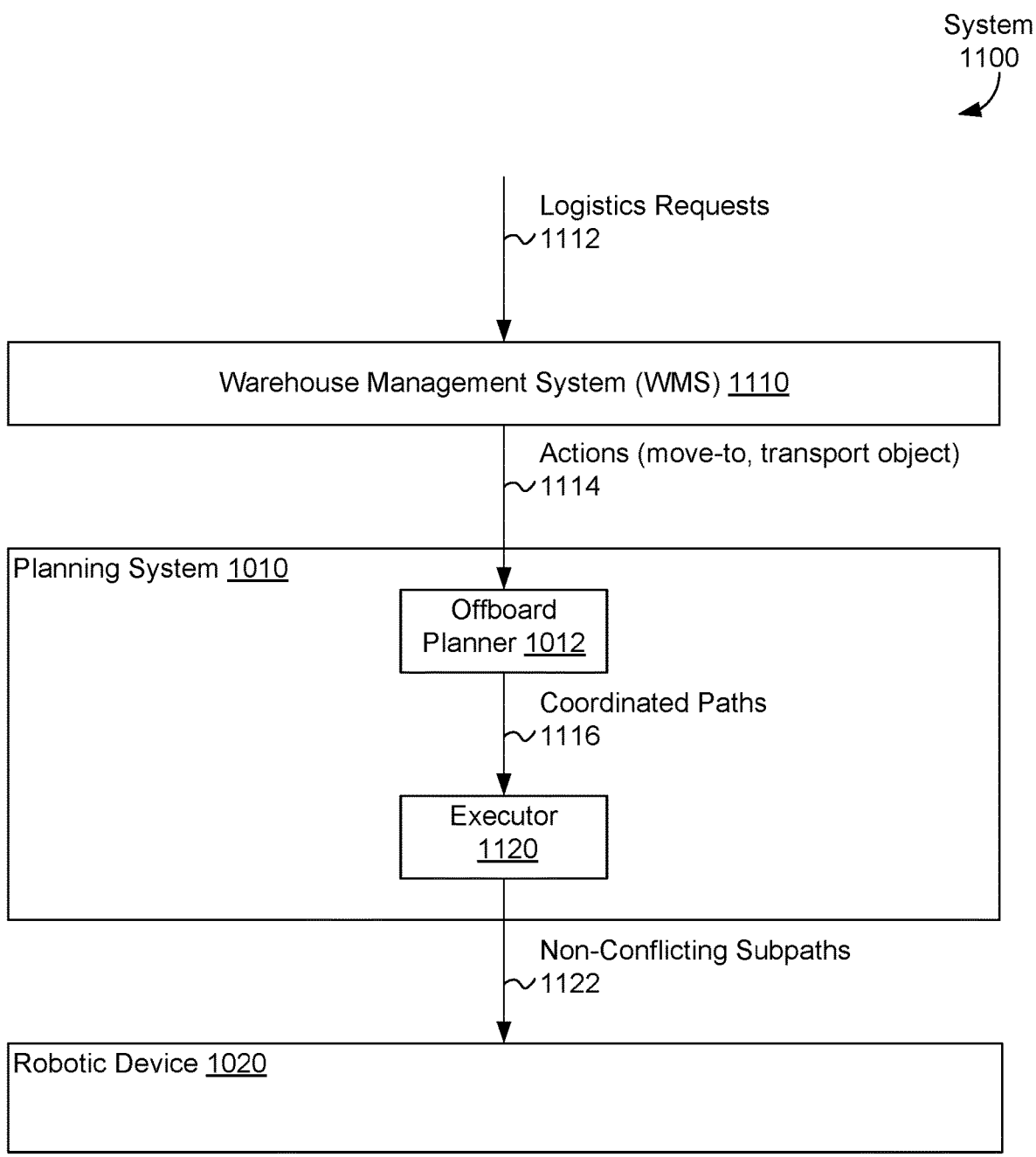
FIG. 11 depicts a system for operating one or more warehouses, in accordance with an example embodiment.

FIG. 11 depicts system 1100 for operating one or more warehouses, in accordance with an example embodiment. System 1100 includes warehouse management system 1110, planning system 1010, and robotic device 1020. Warehouse management system 1110 can receive one or more logistics requests 1112 associated with the warehouse; e.g., requests to store one or more items in the warehouse and/or requests to ship one or more items from the warehouse. Warehouse management system 1110 can translate logistics requests 1112 into one or more actions 1114, where actions 1114 can include, but are not limited to, a "move-to" action to move one or more designated agents to one or more designated locations, and a "transport" action to carry one or more items to one or more designated locations. In some examples, actions 1114 can be go-to commands of the form {agent ID, destination}, but other actions are possible such as "move pallet". These are typically decomposable into move-to commands, however (move to pick location, move to place location).

Planning system 1010 includes offboard planner 1012 and executor 1120. Offboard planner 1012 can receive actions 1114 as inputs and generate one or more coordinated paths 1116 for one or more agents operating in a warehouse; e.g., multiple robotic devices, to carry out actions 1114. Coordinated paths 1116 can be part of a coordinated action plan for all agents in the warehouse to fulfill logistics requests 1112. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 1120 can receive coordinated paths 1116 and generate non-conflicting sub-paths 1122 to direct robotic device 1020 in accomplishing its part of the coordinated action plan to carry out actions 1114 to fulfill logistics requests 1112.

In some examples, offboard planner 1012 can act as a multi-agent planner and generate a coordinated action plan for the one or more agents operating in the warehouse. In these examples, offboard planner 1012 can determine a coordinated action plan that includes at least a route for each of the one or more agents, and can assign each agent with a monotonically increasing priority value; e.g., an amount of time the agent has spent on its route, as discussed above at least in the context of FIGS. 3, 4B-6F, and 9. Also, offboard planner 1012 can determine a coordinated action plan based on a roadmap that includes one or more lanes, as discussed above at least in the context of FIGS. 3-7D. Then, by using the roadmap that includes one or more lanes and by determining routes for agents having monotonically increasing priority values, offboard planner 1012 can determine a coordinated action plan that avoid deadlocks among the one or more agents using the techniques described above in the context of FIGS. 2-9.

As illustrated above in FIG. 11, planning system 1010, which includes offboard planner 1012 and executor 1120, can communicate with robotic device 1020. In some embodiments, the robotic device can be a fork truck, such as, for example, any Occupational Safety and Health Administration (OSHA) Class 1 or Class 3 powered industrial truck. In other embodiments, planning system 1010 can include software that executes using one or more networked computing devices located in the "cloud" (e.g., one or more networked computing devices) and/or located somewhere on a premises co-located with robotic device 1020.

Figure 12:
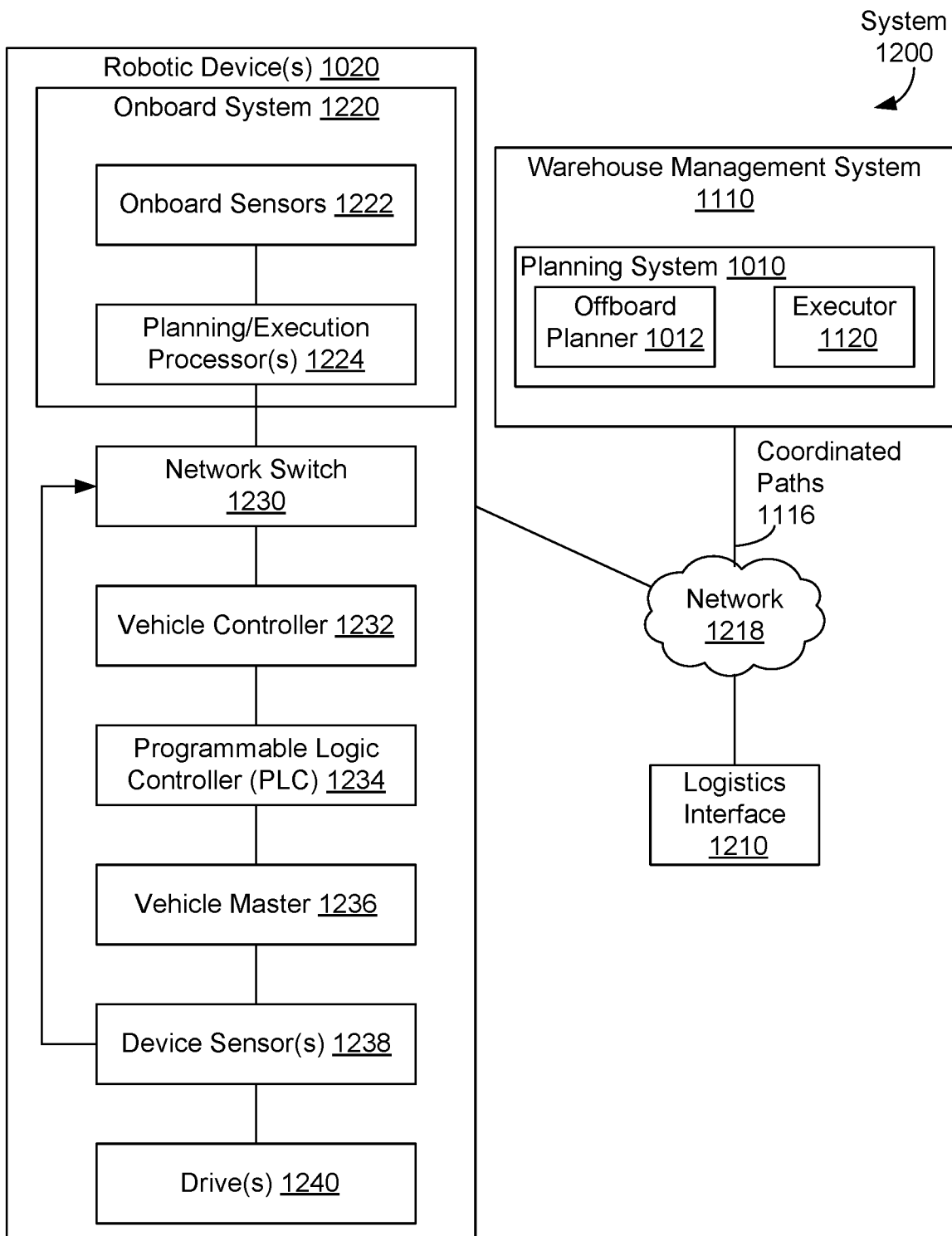
FIG. 12 illustrates a system, in accordance with an example embodiment.

FIG. 12 illustrates a system 1200 that includes logistics interface 1210, warehouse management system 1110, and one or more robotic devices 1020 connected using network 1218, in accordance with an example embodiment. Logistics interface 1210 can provide inventory task instructions to warehouse management system 1110 via network 1218 regarding movement of objects, such as pallets, and/or robotic devices to warehouse management system 1110. An example inventory task can be to bring pallet A containing items of type B to location C.

Warehouse management system 1110 can receive the inventory task instructions from logistics interface 1210 and generate one or more task/mission instructions (e.g., an instruction to robotic device A to move pallet B from location C to location D) and/or plans for controlling robotic device(s) 1020 to carry out the inventory task instructions. The task/mission instructions and/or plans can include information about one or more paths and/or one or more trajectories, where the task/mission instruction(s), plan(s), path(s) and trajectory/trajectories are generated by planning system 1010 of warehouse management system 1110 using the techniques discussed in the context of FIGS. 10 and 11.

For example, warehouse management system 1110 can be a centralized control service running on and storing data using one or more computing devices; e.g., server computing devices. To perform these tasks, warehouse management system 1110 can include WMS middleware and can provide a user interface to provide access to tools for monitoring and managing system 1200. The WMS middleware and/or other components of warehouse management system 1110 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 1110 can provide one or more user interface functions for system 1200, including, but not limited to: monitoring of robotic device(s) 1020, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 1020; and reviewing, updating, deletion, and/or insertion of data related to one or more warehouse maps, pallets, networks, and/or planning systems (e.g., planning system 1010, warehouse management system 1110, and/or logistics interface 1210).

In some embodiments, warehouse management system 1110 can route communications between logistics interface 1210 and robotic device(s) 1020 and between two or more of robotic device(s) 1020 and manage one or more onboard systems, such as onboard system 1220 aboard one or more of robotic device(s) 1020. In other embodiments, warehouse management system 1110 can store, generate, read, write, update, and/or delete data related to system 1200, such as, but not limited to: data regarding completion of a task/mission instruction by one or more of robotic device(s) 1020; data regarding locations and/or poses of some or all of robotic device(s) 1020, including data indicating a location where a robotic device was initialized/booted; data related to one or more audit trails for human actions, incident analysis, and/or debugging; and data for state tracking. In other embodiments, warehouse management system 1110 can include a central message router/persistence manager that communicates with robotic device(s) 1020 and one or more adapters. Each of the one or more adapters can provide access to data and/or communications of system 1200 available to warehouse management system 1110, and can include, but are not limited, to: a user interface service adapter for the above-mentioned user interface, a web content service adapter enabling World Wide Web (WWW)/ Internet access to information about system 1200, a message proxy adapter and/or a WMS adapter to act as intermediaries between communications between APIs and/or the WMS.

In still other embodiments, planning system 1010 and/or warehouse management system 1110 can include some or all of the functionality of a roadmap editor, such as roadmap editor 710 discussed above in the context of FIGS. 7A-7D.

FIG. 12 shows that each of the one or more robotic devices 1020 can include one or more of: onboard system 1220, network switch 1230, vehicle controller 1232, programmable logic controller (PLC) 1234, vehicle master 1236, one or more device sensors 1238, and one or more drives 1240.

Onboard system 1220 can be a computation and sensor package for robotic planning configured for installation into and use with robotic device 1020, where onboard system 1220 can include onboard sensors 1222 and one or more planning/execution processors 1224. FIG. 12 also shows that onboard system 1220 that is configured to use network switch 1230 at least to communicate with planning system 1010 (via network 1218), with device sensors 1238, and/or with one or more actuators of robotic device 1020.

Onboard system 1220 can be responsible for one or more of: localization of robotic device 1020, generation of local trajectories to carry out plans and/or travel along paths and/or trajectories provided by warehouse management system 1110, generation of commands to drives 1240 to follow one or more (local) trajectories, generation of commands to control actuator(s) of robotic device 1020, and reporting pose, status and/or other information to warehouse management system 1110.

Onboard sensors 1222 can include one or more navigation lasers, laser scanners, cameras, and/or other sensors for navigating and/or controlling onboard system 1220. For example, a robotic device of robotic device(s) 1020 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 1224 can include one or more computer processors connected at least to onboard sensors 1222. Planning/execution processor(s) 1224 can read data from onboard sensors 1222, generate local trajectories and/or commands to drive(s) 1240 to move robotic device 1020, and communicate with warehouse management system 1110. A local trajectory can be a trajectory where robotic device 1020 starts at a starting pose and reaches an ending pose at some time. In some examples, the starting pose can be implicitly specified; e.g., the starting pose can be a current pose of robotic device 1020 and so the local trajectory be based on an assumption that its starting pose is the current pose of robotic device 1020.

Planning/execution processor(s) 1224 can utilize a component framework. The component framework can be a multi-threaded job scheduling and message passing system built on software libraries for input/output (I/O) and signaling configured to provide a consistent asynchronous model of robotic device 1020, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 1020 for vehicle initialization, vehicle commanding and fault handling. The state machine component can use a deterministic finite automaton or other state machine to manage the state of the robotic device.

The localization component can read data from vehicle sensors and integrate prior state information of robotic device 1020 to determine a pose of robotic device 1020. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 1110 and determine a local trajectory for robotic device 1020 to achieve those objectives. In some embodiments, the local trajectory can be a short-term trajectory that robotic device 1020 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 1240 that control a traction motor and other actuators for robotic device 1020.

Network switch 1230 can enable communications for robotic device(s) 1020. These communications can include, but are not limited to, communications between onboard system 1220 and the rest of robotic device 1020; e.g, device sensors 1238 and drives 1240, and communications with warehouse management system 1110 via network 1218. For example, network switch 1230 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 1020 and planning system 1010 can include remote procedure calls (RPCs). The remote procedure calls can allow invocation of software procedures, methods, and/or functions resident on one or more of robotic device(s) 1020 by software of planning system 1010 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 1232 and/or programmable logic controller 1234 can provide electrical and sensor management functionality for robotic device(s) 1020. The electrical and sensor management functionality can include, but is not limited to, functionality for electrical load control, lighting control, sensor control, sensor and/or switch signal processing, and power management. Vehicle master 1236 can provide functionality for controlling one or more actuators, such as lift devices, of robotic device(s) 1020.

Device sensor(s) 1238 can include one or more sensors that can provide data related to controlling and/or operating robotic device(s) 1020. The data can provide information about an environment about robotic device(s) 1020, such as but not limited to, localization information, position estimates, and mapping data. For example, device sensor(s) 1238 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 1240 can include one or more drive controllers and/or actuators that provide functionality for moving robotic device(s) 1020. The drive controllers can direct the drive actuators to control movement of robotic device(s) 1020. The drive actuators can include one or more traction motors, electric drives, hydraulic drives, and pneumatic drives.

Figure 13:
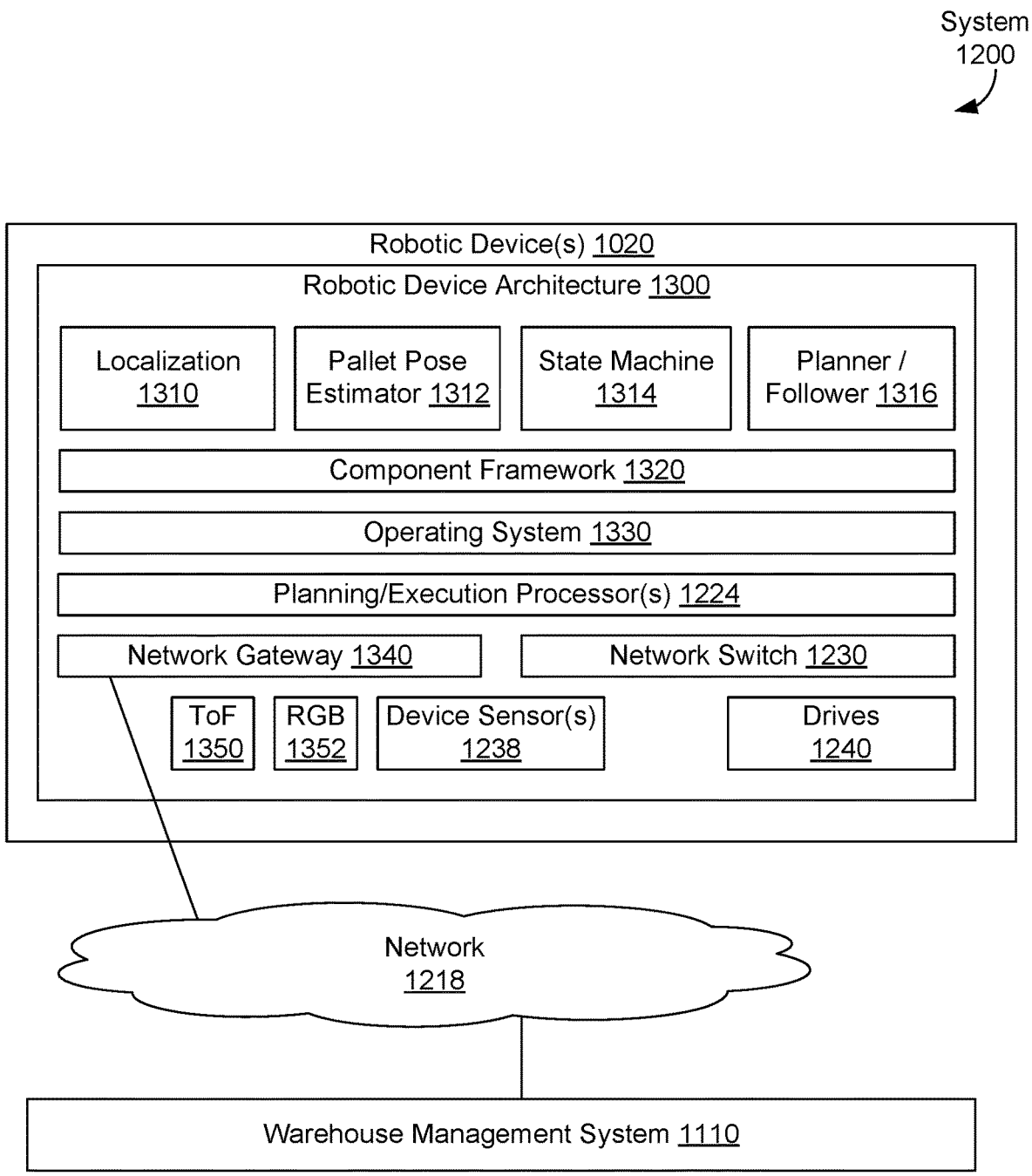
FIG. 13 illustrates a robotic device architecture for one or more robotic devices, in accordance with an example embodiment.

FIG. 13 illustrates robotic device architecture 1300 of robotic device(s) 1020, in accordance with an example embodiment. Robotic device architecture 1300 of robotic device(s) 1020 can include software. The software can include software for localization 1310, software for a pallet pose estimator 1312, software related to state machine 1314, software for planner follower 1316, software for component framework 1320 and software for operating system 1330. The software can be executed by one or more hardware planning/execution processors 1224. Communications between robotic device(s) 1020 and other devices can be carried out using network gateway 1340 and/or network switch 1230. For example, network gateway 1340 can be used for wireless communications with and within a robotic device of robotic device(s) 1020 and network switch 1230 can be used for wireline communications with and within a robotic device of robotic device(s) 1020. Robotic device architecture 1300 also includes additional hardware such as device sensor(s) 1238 and drive(s) 1240 discussed above in the context of FIG. 12. In some embodiments, robotic device architecture 1300 can include one or more cameras, including but not limited to, ToF camera 1350 and RGB camera 1352, where the one or more cameras can include one or more still cameras and/or one or more video cameras.

Computing Device Architecture

Figure 14A:
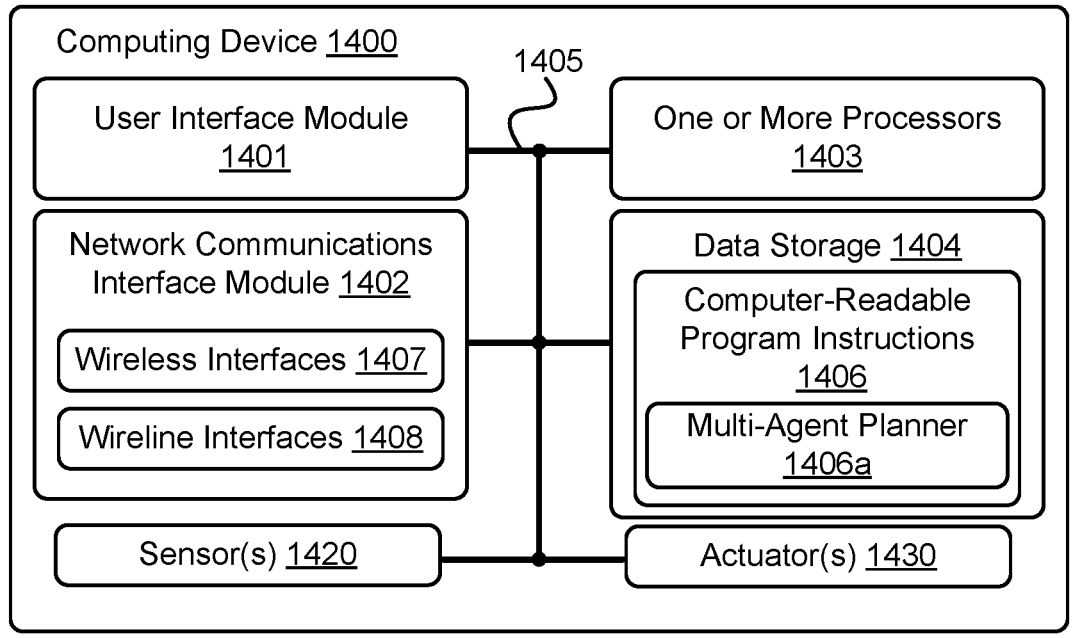
FIG. 14A is a functional block diagram of an example computing device, in accordance with an example embodiment.

FIG. 14A is a functional block diagram of an example computing device 1400, in accordance with an example embodiment. In particular, computing device 1400 shown in FIG. 14A can be configured to perform at least one function of a herein-described multi-agent planner, software for a multi-agent planner, robots 110, 120, 130, 140, 214, 224, 234, 244, 330, 332, 414, 416, 424, 426, 434, 436, 444, 446, 470, 472, 474, 476, 510, 520, 530, 550, 610, 620, computing device 702, roadmap editor 710, system 1000, planning system 1010, offboard planner 1012, roadmap planner 1014, robotic device 1020, system 1100, warehouse management system 1110, executor 1120, system 1200, logistics interface 1210, network 1218, 1414, onboard system 1220, network switch 1230, vehicle controller 1232, programmable logic controller 1234, vehicle master 1236, device sensor(s) 1238, drive(s) 1240, robotic device architecture 1300, and/or at least one function related to roadmaps 310, 402, 502, 602, 720, scenarios 100, 200, 300, 400, 500, 600, 700, methods 800, 1500, and priority cycle 900. Computing device 1400 may include a user interface module 1401, a network-communication interface module 1402, one or more processors 1403, data storage 1404, one or more sensors 1420, and one or more actuators 1430, all of which may be linked together via a system bus, network, or other connection mechanism 1405. In some embodiments, computing device 1400 can be configured to act as part or all of a multi-agent planner.

User interface module 1401 can be operable to send data to and/or receive data from external user input/output devices. For example, user interface module 1401 can be configured to send and/or receive data to and/or from user input devices such as a keyboard, a keypad, a touch screen, a computer mouse, a track ball, a joystick, a camera, a voice recognition module, and/or other similar devices. User interface module 1401 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1401 can also be configured to generate audible output(s), such as a speaker, speaker jack, audio output port, audio output device, earphones, and/or other similar devices.

Network-communications interface module 1402 can include one or more wireless interfaces 1407 and/or one or more wireline interfaces 1408 that are configurable to communicate via a network. Wireless interfaces 1407 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1408 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1402 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 1403 can include one or more general purpose processors, and/or one or more special purpose processors (e.g., digital signal processors, graphics processing units, application specific integrated circuits, etc.). Processors 1403 can be configured to execute computer-readable program instructions 1406 that are contained in the data storage 1404 and/or other instructions as described herein. In some embodiments, computer-readable program instructions 1406 can include instructions for multi-agent planner 1406a, which can carry out some or all of the functionality of a herein-described multi-agent planner Data storage 1404 can include one or more computer-readable storage media that can be read and/or accessed by at least one of processors 1403. The one or more computer-readable storage media can include volatile and/or non-volatile storage components, such as optical, magnetic, organic or other memory or disc storage, which can be integrated in whole or in part with at least one of processors 1403. In some embodiments, data storage 1404 can be implemented using a single physical device (e.g., one optical, magnetic, organic or other memory or disc storage unit), while in other embodiments, data storage 1404 can be implemented using two or more physical devices.

Data storage 1404 can include computer-readable program instructions 1406 and perhaps additional data. In some embodiments, data storage 1404 can additionally include storage required to perform at least part of the herein-described methods and techniques and/or at least part of the functionality of the devices and networks.

In some embodiments, computing device 1400 can include one or more sensors 1420. Sensor(s) 1420 can be configured to measure conditions in an environment for computing device 1400 and provide data about that environment; e.g., an environment represented by a herein-described roadmap. For example, sensor(s) 1420 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 1400, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 1400, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 1400, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 1420 are possible as well.

Computing device 1400 can include one or more actuators 1430 that enable computing device 1400 to initiate movement. For example, actuator(s) 1430 can include or be incorporated with robotic joints connecting robotic limbs to a robotic body. For example, actuator(s) 1430 can include respective robotic hip and robotic shoulder joints connecting respective robotic legs and arms to the robotic body. Further, the actuator(s) 1430 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 1430 can include respective robotic ankle joints connecting the robotic legs to robotic feet and respective robotic wrist joints connecting the robotic arms to robotic hands. In addition, actuator(s) 1430 can include motors for moving the robotic limbs. As such, the actuator(s) 1430 can enable mobility of computing device 1400. Many other examples of actuator(s) 1430 are possible as well.

Cloud-Based Servers

Figure 14B:
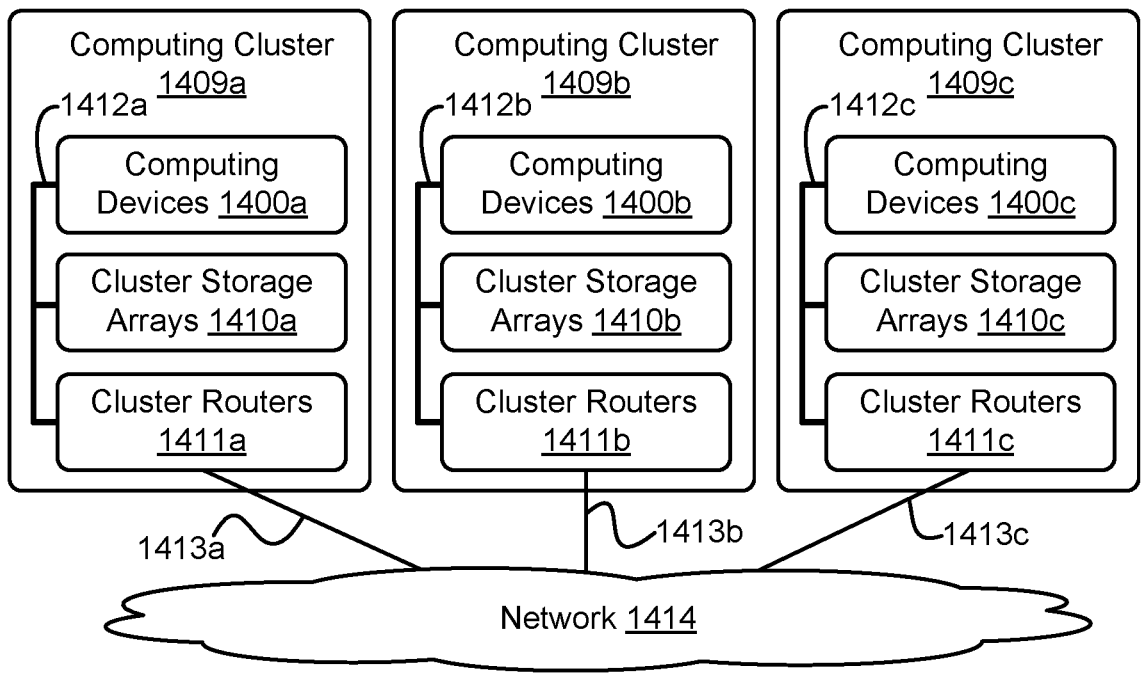
FIG. 14B depicts a network of computing clusters arranged as a cloud-based server system, in accordance with an example embodiment.

FIG. 14B depicts a network 1414 of computing clusters 1409a, 1409b, 1409c arranged as a cloud-based server system in accordance with an example embodiment. Computing clusters 1409a, 1409b, 1409c can be cloud-based devices that store program logic and/or data of cloud-based applications and/or services; e.g., perform at least one function of a herein-described multi-agent planner, software for a multi-agent planner, robots 110, 120, 130, 140, 214, 224, 234, 244, 330, 332, 414, 416, 424, 426, 434, 436, 444, 446, 470, 472, 474, 476, 510, 520, 530, 550, 610, 620, computing device 702, roadmap editor 710, system 1000, planning system 1010, offboard planner 1012, roadmap planner 1014, robotic device 1020, system 1100, warehouse management system 1110, executor 1120, system 1200, logistics interface 1210, network 1218, 1414, onboard system 1220, network switch 1230, vehicle controller 1232, programmable logic controller 1234, vehicle master 1236, device sensor(s) 1238, drive(s) 1240, robotic device architecture 1300, and/or at least one function related to roadmaps 310, 402, 502, 602, 720, scenarios 100, 200, 300, 400, 500, 600, 700, methods 800, 1500, and priority cycle 900.

In some embodiments, computing clusters 1409a, 1409b, 1409c can be a single computing device residing in a single computing center. In other embodiments, computing clusters 1409a, 1409b, 1409c can include multiple computing devices in a single computing center, or even multiple computing devices located in multiple computing centers located in diverse geographic locations. For example, FIG. 14B depicts each of computing clusters 1409a, 1409b, 1409c residing in different physical locations.

In some embodiments, data and services at computing clusters 1409a, 1409b, 1409c can be encoded as computer readable information stored in non-transitory, tangible computer readable media (or computer readable storage media) and accessible by other computing devices. In some embodiments, computing clusters 1409a, 1409b, 1409c can be stored on a single disk drive or other tangible storage media, or can be implemented on multiple disk drives or other tangible storage media located at one or more diverse geographic locations.

FIG. 14B depicts a cloud-based server system in accordance with an example embodiment. In FIG. 14B, functionality of a safety system can be distributed among three computing clusters 1409a, 1409b, and 1409c. Computing cluster 1409a can include one or more computing devices 1400a, cluster storage arrays 1410a, and cluster routers 1411a connected by a local cluster network 1412a. Similarly, computing cluster 1409b can include one or more computing devices 1400b, cluster storage arrays 1410b, and cluster routers 1411b connected by a local cluster network 1412b. Likewise, computing cluster 1409c can include one or more computing devices 1400c, cluster storage arrays 1410c, and cluster routers 1411c connected by a local cluster network 1412c.

In some embodiments, each of the computing clusters 1409a, 1409b, and 1409c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1409a, for example, computing devices 1400a can be configured to perform various computing tasks of a multi-agent planner, a robot, a roadmap editor, and/or a computing device. In one embodiment, the various functionalities of a multi-agent planner, a robot, a roadmap editor, and/or a computing device can be distributed among one or more computing devices 1400a, 1400b, and 1400c. Computing devices 1400b and 1400c in respective computing clusters 1409b and 1409c can be configured similarly to computing devices 1400a in computing cluster 1409a. On the other hand, in some embodiments, computing devices 1400a, 1400b, and 1400c can be configured to perform different functions.

In some embodiments, computing tasks and stored data associated with a multi-agent planner, a robot, a roadmap editor, and/or a computing device can be distributed across computing devices 1400a, 1400b, and 1400c based at least in part on the processing requirements of a multi-agent planner, a robot, a roadmap editor, and/or a computing device, the processing capabilities of computing devices 1400a, 1400b, and 1400c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1410a, 1410b, and 1410c of the computing clusters 1409a, 1409b, and 1409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a multi-agent planner, a robot, a roadmap editor, and/or a computing device can be distributed across computing devices 1400a, 1400b, and 1400c of computing clusters 1409a, 1409b, and 1409c, various active portions and/or backup portions of these components can be distributed across cluster storage arrays 1410a, 1410b, and 1410c. For example, some cluster storage arrays can be configured to store one portion of the data of a multi-agent planner, a robot, a roadmap editor, and/or a computing device, while other cluster storage arrays can store other portion(s) of data of a multi-agent planner, a robot, a roadmap editor, and/or a computing device. Additionally, some cluster storage arrays can be configured to store backup versions of data stored in other cluster storage arrays.

The cluster routers 1411a, 1411b, and 1411c in computing clusters 1409a, 1409b, and 1409c can include networking equipment configured to provide internal and external communications for the computing clusters. For example, the cluster routers 1411a in computing cluster 1409a can include one or more internet switching and routing devices configured to provide (i) local area network communications between the computing devices 1400a and the cluster storage arrays 1410a via the local cluster network 1412a, and (ii) wide area network communications between the computing cluster 1409a and the computing clusters 1409b and 1409c via the wide area network connection 1413a to network 1414. Cluster routers 1411b and 1411c can include network equipment similar to the cluster routers 1411a, and cluster routers 1411b and 1411c can perform similar networking functions for computing clusters 1409b and 1409b that cluster routers 1411a perform for computing cluster 1409a.

In some embodiments, the configuration of the cluster routers 1411a, 1411b, and 1411c can be based at least in part on the data communication requirements of the computing devices and cluster storage arrays, the data communications capabilities of the network equipment in the cluster routers 1411a, 1411b, and 1411c, the latency and throughput of local networks 1412a, 1412b, 1412c, the latency, throughput, and cost of wide area network links 1413a, 1413b, and 1413c, and/or other factors that can contribute to the cost, speed, fault-tolerance, resiliency, efficiency and/or other design criteria of the moderation system architecture.

Example Methods of Operation

FIG. 15 is a flowchart of method 1500, in accordance with an example embodiment.

Method 1500 can be carried out by a computing device, such as computing device 1400. In particular, computing device 1400 can execute software embodying a herein-described multi-agent planner to carry out method 1500.

Method 1500 can begin at block 1510, where a computing device can receive a roadmap of an existing environment that includes a first robot and a second robot, such as discussed above in the context of at least FIGS. 3 and 7A-7D.

At block 1520, the computing device can annotate the roadmap with a plurality of lanes connecting a plurality of conflict regions, where each lane is unidirectional and ends sufficiently distant from a conflict region to avoid blocking the conflict region, such as discussed above in the context of at least FIGS. 7A-7D. In some embodiments, annotating the roadmap with the plurality of lanes includes can include: attempting to annotate the roadmap with a new lane using the computing device; determining whether the new lane is unidirectional and ends sufficiently distant from a conflict region to avoid blocking the conflict region using the computing device; and after determining that new lane is unidirectional and ends sufficiently distant from a conflict region to avoid blocking the conflict region, annotating the roadmap with the new lane, such as discussed above in the context of at least FIGS. 7A-7D. In particular of these embodiments, attempting to annotate the roadmap with the new lane can include: determining a location on the roadmap for the new lane using the computing device; and attempting to annotate the location on the roadmap with the new lane using the computing device, such as discussed above in the context of at least FIGS. 7A-7D. In other embodiments, annotating the roadmap with the plurality of lanes can include: selecting a first-paired lane and a second-paired lane from the one or more lanes; determining whether a robot on the first-paired lane collides with a robot on the second-paired lane; and after determining that a robot on the first-paired lane does collide with a robot on the second-paired lane, determining that the first-paired lane and/or the second-paired lane is not a lane, such as discussed above in the context of at least FIGS. 7A-7D.

At block 1530, a first route through the environment along the roadmap for use by the first robot and a second route through the environment along the roadmap for use by the second robot can be determined, where both the first route and the second route include a first lane, and where the first lane connects to a first conflict region, such as discussed above in the context of at least FIGS. 3-6F. In some embodiments, the first route can include a sequence of lanes and corresponding wait times that lead the first robot from a starting location to a destination location, such as discussed above in the context of at least FIGS. 5A-5F. In other embodiments, determining the first route through the environment can include reserving a second conflict region along the first route for exclusive use by the first robot, where the second conflict region lies between two or more lanes, such as discussed above in the context of at least FIGS. 4A-5F and 8. In particular of these embodiments, the second conflict region can include an intersection between two lanes, such as discussed above in the context of at least FIGS. 4A-5F. In other particular of these embodiments, an unannotated portion of the roadmap is not annotated by the one or more lanes, and where the second conflict region includes the unannotated portion of the roadmap, such as discussed above in the context of at least FIGS. 7A-7F.

At block 1540, a first priority to the first robot and a second priority to the second robot can be assigned, where the first priority is higher than the second priority, such as discussed above in the context of at least FIGS. 3-6F, 8, and 9. In some embodiments, the first priority and the second priority can both based on a monotonically increasing function, such as discussed above at least in the context of FIGS. 3, 4B-6F, 9, and 10. In particular of these embodiments, the monotonically increasing function can determine one or more of: an amount of time taken by a robot while traveling on its route and a route-start value indicating a number of robots that have started on their routes since a robot started on the route, such as discussed above at least in the context of FIGS. 3, 4B-6F, 9, and 10.

At block 1550, it can be determined that the second robot following the second route will cause the second robot to block the first robot on the first lane before the first robot reaches the first conflict region, such as discussed above in the context of at least FIGS. 3 and 5A-6F.

At block 1560, the second route can be altered to prevent the second robot from blocking the first robot on the first lane, based on the first priority being higher than the second priority, such as discussed above in the context of at least FIGS. 3 and 5A-6F.

In some embodiments, the first conflict region can be reserved for exclusive use by the first robot; then, altering the second route to prevent the second robot from blocking the first robot on the first lane can include: releasing a first reservation of the first conflict region for exclusive use by the first robot; after releasing the first reservation of the first conflict region, obtaining a second reservation of the first conflict region for exclusive use by the second robot; after obtaining the second reservation, instructing the second robot to leave the first edge and enter the first conflict region; and after the second robot has traversed the first conflict region: releasing the second reservation; and obtaining a third reservation of the first conflict region for exclusive use by the first robot, such as discussed above in the context of at least FIGS. 5A-5F. In particular embodiments, method 1500 can further include: after the second robot has traversed the first conflict region, instructing the second robot to continue to a destination location via the second route, such as discussed above in the context of at least FIGS. 5A-5F. In other embodiments, the roadmap can be annotated with a cycle of lane; then, altering the second route to avoid blocking the first robot on the first lane can include altering the second route to travel through the cycle of lanes, such as discussed above in the context of at least FIGS. 5A-5F. In still other embodiments, altering the second route for the second robot to avoid blocking the first lane can include instructing the second robot to wait on a particular lane of the one or more lanes such as discussed above in the context of at least FIGS. 4A-4E.

In some embodiments, method 1500 can further include: resetting the first priority after the first robot completes the first route, such as discussed above in the context of at least FIGS. 3 and 5A-6F.

In other embodiments, method 1500 can further include: determining a presence of an obstacle on the first route that blocks the first robot; after determining the presence of the obstacle on the first route that blocks the first robot: generating a warning message indicating the presence of the obstacle; and determining a new route for the first robot that avoids the obstacle, such as discussed above in the context of at least FIG. 3.

In still other embodiments, a third route of a third robot can overlap an overlapping portion of the route that has been reserved for the first robot; then method 1500 can further include: determining whether a third priority of the third robot is less than the first priority; after determining that the third priority is less than the first priority, determining whether the third robot is at a position to traverse the overlapping portion before the first robot reaches the overlapping portion; and after determining that the third robot is at the position to traverse the overlapping portion before the first robot reaches the overlapping portion, instructing the third robot to traverse the overlapping portion before the first robot reaches the overlapping portion, such as discussed above in the context of at least FIGS. 5A-5F.

The present disclosure is not to be limited in terms of the particular embodiments described in this application, which are intended as illustrations of various aspects. Some of the herein-disclosed techniques are described in terms of operations involving robots, but those herein-disclosed techniques are applicable to agents in general unless explicitly stated otherwise. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
   causing a first robot to follow a route through an environment, the first robot having a first priority, wherein the route comprises a set of lanes based on a roadmap of the environment, wherein each lane in the set of lanes is unidirectional, wherein the first priority changes as the first robot follows the route through the environment based on a monotonically increasing function in which the first priority stays the same or increases but does not decrease until the first robot completes a task and/or the route, wherein the monotonically increasing function determines a route-start value indicating a number of robots that have started on their routes since the first robot started on the route;
   determining that the first robot following the route will cause the first robot to block a second robot on a lane in the set of lanes, the second robot having a second priority;
   altering the route, when the second priority is higher than the first priority, to prevent the first robot from blocking the second robot on the lane.

2. The method of claim 1, further comprising annotating the roadmap with a plurality of lanes including the set of lanes before causing the first robot to follow the route through the environment.

3. The method of claim 2, wherein annotating the roadmap with the plurality of lanes comprises:
   attempting to annotate the roadmap with a new lane;
   determining whether the new lane is unidirectional and ends sufficiently distant from a conflict region to avoid blocking the conflict region; and
   after determining that new lane is unidirectional and ends sufficiently distant from a conflict region to avoid blocking the conflict region, annotating the roadmap with the new lane.

4. The method of claim 3, wherein attempting to annotate the roadmap with the new lane comprises:
   determining a location on the roadmap for the new lane; and
   attempting to annotate the location on the roadmap with the new lane.

5. The method of claim 2, wherein annotating the roadmap with the plurality of lanes comprises:
   selecting a first-paired lane and a second-paired lane;
   determining whether a robot on the first-paired lane collides with a robot on the second-paired lane; and
   after determining that a robot on the first-paired lane does collide with a robot on the second-paired lane, determining that the first-paired lane and/or the second-paired lane is not a lane.

6. The method of claim 1, wherein the route comprises the set of lanes and corresponding wait times that lead the first robot from a starting location to a destination location.

7. The method of claim 1, further comprising:
   determining a presence of an obstacle on the route that blocks the first robot; and
   after determining the presence of the obstacle on the route that blocks the first robot:
      generating a warning message indicating the presence of the obstacle, and
      determining a new route for the first robot that avoids the obstacle.

8. The method of claim 1, wherein a route of a third robot overlaps an overlapping portion of the route that has been reserved for the first robot, and wherein the method further comprises:
   determining whether the third robot has a lower priority than the first robot;
   after determining that the third robot has the lower priority than the first robot, determining whether the third robot is at a position to traverse the overlapping portion before the first robot reaches the overlapping portion; and
   after determining that the third robot is at the position to traverse the overlapping portion before the first robot reaches the overlapping portion, instructing the third robot to traverse the overlapping portion before the first robot reaches the overlapping portion.

9. The method of claim 1, further comprising reserving a conflict region along the route for exclusive use by the first robot, wherein the conflict region lies between two or more lanes of the set of lanes.

10. The method of claim 9, wherein the conflict region comprises an intersection between two lanes.

11. The method of claim 9, wherein an unannotated portion of the roadmap is not annotated by the one or more lanes, and wherein the conflict region comprises the unannotated portion of the roadmap.

12. A computing device, comprising:
   one or more processors; and
   data storage including at least computer-executable instructions stored thereon that, when executed by the one or more processors, cause the computing device to:
      cause a first robot to follow a route through an environment, the first robot having a first priority, wherein the route comprises a set of lanes based on a roadmap of the environment, wherein each lane in the set of lanes is unidirectional, wherein the first priority changes as the first robot follows the route through the environment based on a monotonically increasing function in which the first priority stays the same or increases but does not decrease until the first robot completes a task and/or the route, wherein the monotonically increasing function determines a route-start value indicating a number of robots that have started on their routes since the first robot started on the route;
      determine that the first robot following the route will cause the first robot to block a second robot on a lane of the set of lanes, the second robot having a second priority; and
      alter the route, when the second priority is higher than the first priority, to prevent the first robot from blocking the second robot on the lane.

13. A non-transitory computer readable medium having stored thereon instructions, that when executed by one or more processors of a computing device, cause the computing device to perform functions comprising:
   causing a first robot to follow a route through an environment, the first robot having a first priority, wherein the route comprises a set of lanes based on a roadmap of the environment, wherein each lane in the set of lanes is unidirectional, wherein the first priority changes as the first robot follows the route through the environment based on a monotonically increasing function in which the first priority stays the same or increases but does not decrease until the first robot completes a task and/or the route, wherein the monotonically increasing function determines a route-start value indicating a number of robots that have started on their routes since the first robot started on the route;

determining that the first robot following the route will cause the first robot to block a second robot on a lane in the set of lanes, the second robot having a second priority; and altering the route, when the second priority is higher than the first priority, to prevent the first robot from blocking the second robot on the lane.

14. The method of claim 1, wherein the environment is a warehouse and wherein causing the first robot to follow the route through the environment comprises causing the first robot to traverse a unidirectional lane in the warehouse.

15. The method of claim 1, wherein the first priority changes based, at least in part, on an amount of time the first robot has been traveling along the route.

16. The method of claim 1, wherein altering the route comprises adding a lane cycle to the route.

17. The computing device of claim 12, wherein the environment is a warehouse and wherein causing the first robot to follow the route through the environment comprises causing the first robot to traverse a unidirectional lane in the warehouse.

18. The computing device of claim 12, wherein the first priority changes based, at least in part, on an amount of time the first robot has been traveling along the route.

19. The computing device of claim 12, wherein altering the route comprises adding a lane cycle to the route.

20. The non-transitory computer readable medium of claim 13, wherein the environment is a warehouse and wherein causing the first robot to follow the route through the environment comprises causing the first robot to traverse a unidirectional lane in the warehouse.

21. The non-transitory computer readable medium of claim 13, wherein the first priority changes based, at least in part, on an amount of time the first robot has been traveling along the route.

22. The non-transitory computer readable medium of claim 13, wherein altering the route comprises adding a lane cycle to the route.

* * * * *